US007770803B2

(12) United States Patent
Onishi

(10) Patent No.: US 7,770,803 B2
(45) Date of Patent: Aug. 10, 2010

(54) CODE PATTERN IMAGE GENERATION APPARATUS AND METHOD, CODE PATTERN IMAGE READER APPARATUS AND METHOD, AND CODE PATTERN IMAGE MEDIUM

(75) Inventor: Takeshi Onishi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 303 days.

(21) Appl. No.: 11/329,718

(22) Filed: Jan. 11, 2006

(65) Prior Publication Data

US 2007/0023523 A1 Feb. 1, 2007

(30) Foreign Application Priority Data

Aug. 1, 2005 (JP) .............................. 2005-222914

(51) Int. Cl.
*G06K 19/06* (2006.01)
(52) U.S. Cl. ....................................... 235/494; 235/454
(58) Field of Classification Search ................. 235/494, 235/454, 462.08, 462.2
See application file for complete search history.

(56) References Cited

U.S. PATENT DOCUMENTS

| 5,661,506 | A | * | 8/1997 | Lazzouni et al. ............ 345/179 |
| 5,825,947 | A | * | 10/1998 | Sasaki et al. ................ 382/321 |
| 5,866,895 | A | * | 2/1999 | Fukuda et al. .............. 235/494 |
| 5,897,669 | A | * | 4/1999 | Matsui ................... 235/462.07 |
| 5,898,166 | A | * | 4/1999 | Fukuda et al. .............. 235/494 |
| 6,116,507 | A | * | 9/2000 | Fukuda et al. .............. 235/454 |
| 6,116,510 | A | * | 9/2000 | Nishino ..................... 235/494 |
| 6,279,830 | B1 | * | 8/2001 | Ishibashi ................... 235/494 |
| 6,565,003 | B1 | * | 5/2003 | Ma ........................ 235/462.1 |
| 6,571,025 | B2 | * | 5/2003 | Nada ......................... 382/314 |
| 2002/0027165 | A1 | * | 3/2002 | Iwai et al. ................. 235/494 |
| 2002/0070281 | A1 | * | 6/2002 | Nimura et al. ............. 235/494 |
| 2004/0035935 | A1 | * | 2/2004 | Takahashi et al. ...... 235/462.09 |
| 2004/0190092 | A1 | * | 9/2004 | Silverbrook et al. ........ 358/539 |
| 2006/0193522 | A1 | * | 8/2006 | Sonoda et al. ............. 382/232 |

FOREIGN PATENT DOCUMENTS

| JP | 6075795 | 3/1994 |
| JP | 6103390 | 4/1994 |
| JP | 2000-293303 | 10/2000 |
| JP | 2001-51792 | 2/2001 |
| JP | 2004-94907 | 3/2004 |

* cited by examiner

*Primary Examiner*—Daniel A Hess
*Assistant Examiner*—Paultep Savusdiphol
(74) *Attorney, Agent, or Firm*—Gauthier & Connors LLP

(57) ABSTRACT

A code pattern image generation apparatus for generating a code pattern image, which includes position-dependent information differing at every position and position-independent information in common at various positions, the code pattern image generation apparatus includes; an image generator that generates a code pattern image by disposing a plurality of position-dependent code images, which include position-dependent information, at a mutually predetermined spacing along at least one side and repeatedly disposing a position-independent code image, which includes position-independent information, in the spacing between the disposed position-dependent code images.

6 Claims, 26 Drawing Sheets

PATTERN 0         PATTERN 1

CODE PATTERN IMAGE GENERATION APPARATUS AND METHOD, CODE PATTERN IMAGE READER APPARATUS AND METHOD, AND CODE PATTERN IMAGE MEDIUM

PRIORITY INFORMATION

This application claims priority to Japanese Patent Application No. 2005-222914, filed on Aug. 1, 2005, which is incorporated herein by reference in its entirety.

BACKGROUND

1. Technical Field

The present invention relates to a technique for embedding and utilizing information encoded on a medium, such as a sheet of paper, and more particularly, for example, to a technique for generating and reading a code pattern image that includes position-dependent information differing at every position and position-independent information in common at various positions.

2. Related Art

A technique has been developed for combining digital information and handwritten information, such as on paper, by embedding identification information for a paper sheet and positional information at various points on the paper sheet into a two-dimensional code and superimposing and printing this code with an electronic document. In this technique, a device scans the paper sheet, detects the two-dimensional code, and decodes the code to identify the paper sheet and identify the position on the paper sheet of the handwritten information so that the handwritten information on the paper sheet can be reflected at the appropriate position on the appropriate page within the digital information.

When scanning two-dimensional codes with a pen-shaped scanner or a scanner attached to a pen, the paper sheet is only locally scanned. Thus, to correctly reflect the information of the scanned portion into digital information, the scanned portion must include both the positional information and the identification information for the paper sheet. When the identification information for the paper sheet and the positional information on the paper sheet are stored in one two-dimensional code, the size (area) of the two-dimensional code increases so that a wide range needs to be scanned by the image scanning apparatus.

However, in the case where scanning is performed at an inclination with the pen-shaped scanner or scanner attached with a pen, the influence of distortion or focal deviation of the image increases with a larger scanned area so that the two-dimensional code becomes difficult to correctly decode from the scanned image or substantially impossible to decode in extreme cases. If smaller symbols are used in the two-dimensional code, the two-dimensional code can be made smaller and the scanning area of the scanner can be made smaller. However, there is a limit as to making the symbol smaller due to the constraints of resolution of the printing device and resolution of the scanner. In particular, if printing the two-dimensional code with a digital photographic printing system or inkjet system printer for office or general consumer use is considered, the symbol cannot be made too small due to limitations in printing resolution.

The problem of combining the identification information for the paper sheet and the positional information on the paper sheet was described hereinbefore. However, this describes one application. Instead of the identification information for the paper sheet, an application can be considered where various types of information, such as the page identification information for the electronic document, the identification information for the electronic document itself, the identification information for the printing device that printed the two-dimensional code pattern on the paper sheet, are embedded on various locations on the paper sheet and used as common information within the paper sheet. Furthermore, when assigning unique positional information within one notebook at each point within each page of the notebook, an application can also be considered where positional information is used within a unit region differing from the paper sheet. Furthermore, an application can also be considered where different information is included at every position at each point within the paper sheet as well as other points. The above-mentioned problems resulting from the large area of the two-dimensional code generally occurs in applications where the two-dimensional code is embedded and includes information dependent on position, such as positional information at each position on the paper sheet, and information that does not depend on position.

SUMMARY

According to an aspect of the present invention, there is provided a code pattern image generation apparatus for generating a code pattern image, which includes position-dependent information differing at every position and position-independent information in common at various positions, the code pattern image generation apparatus includes; an image generator that generates a code pattern image by disposing a plurality of position-dependent code images, which include position-dependent information, at a mutually predetermined spacing along at least one side and repeatedly disposing a position-independent code image, which includes position-independent information, in the spacing between the disposed position-dependent code images.

BRIEF DESCRIPTION OF THE DRAWINGS

These and other aspects of the disclosure will become apparent from the following description read in conjunction with the accompanying drawings wherein the same reference numerals have been applied to like parts and in which.

DETAILED DESCRIPTION

Figure 1:
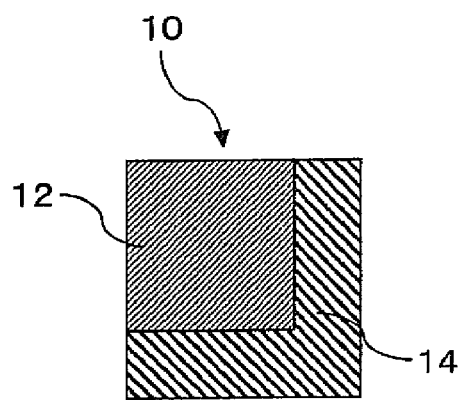
FIG. 1 schematically shows a configuration of a unit region forming a two-dimensional code pattern of an embodiment.

Referring first to FIG. 1, the structure of a two-dimensional code pattern image in the embodiment will be described. The two-dimensional code pattern image is printed on a medium, such as a sheet of paper, and expresses a position (coordinate) of each point on the medium surface and common information between the positions. The two-dimensional code pattern image of this embodiment can be typically applied as digitized annotation as described in documents 1 through 3. However, the field of application is not limited to this. Furthermore, a typical example where the two-dimensional code pattern image is printed on a sheet of paper will be described hereinafter. It should be appreciated that the present invention is also applicable to a non-sheet medium, such as a paper roll, or a non-paper printable medium, such as a transparent plastic sheet.

The two-dimensional code pattern image of this embodiment is configured by arranging a unit region 10 in a two-dimensional matrix as shown in FIG. 1.

Figure 2:
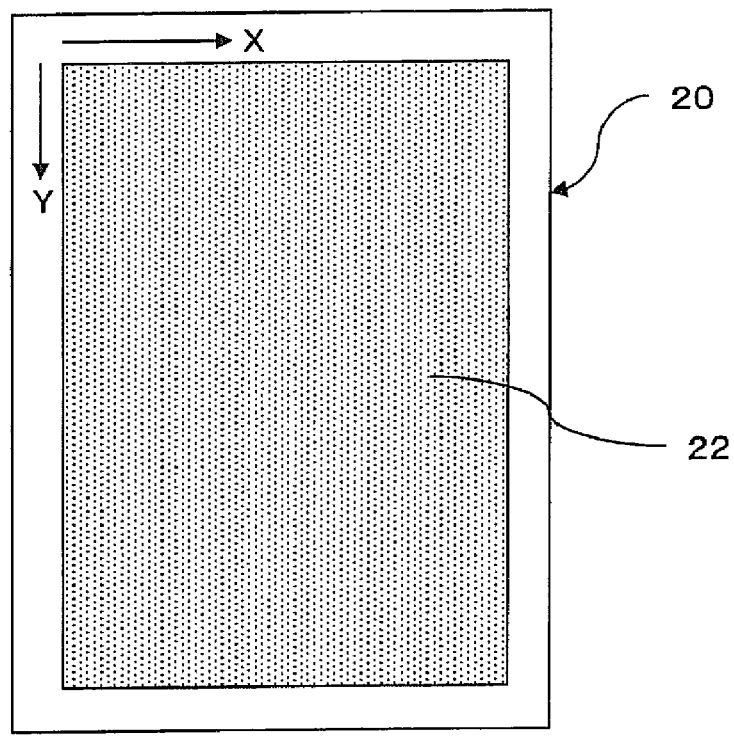
FIG. 2 illustrates an example of a code pattern area that is set on a paper surface.

For example, as shown in FIG. 2, a rectangular region minus a margin having a predetermined width from each of the four edges on a sheet 20 is a code pattern area 22 for printing a two-dimensional code pattern. With the point at the top left corner of the area 22 as an origin of coordinates, a rectangular coordinate system having the direction to the right as the positive direction of the x axis and the downward direction as the positive direction of the y axis can be considered. The substantially close arrangement of the rectangular unit region 10 to the x and y axes in the code pattern area 22 becomes the two-dimensional code pattern image.

Figure 3:
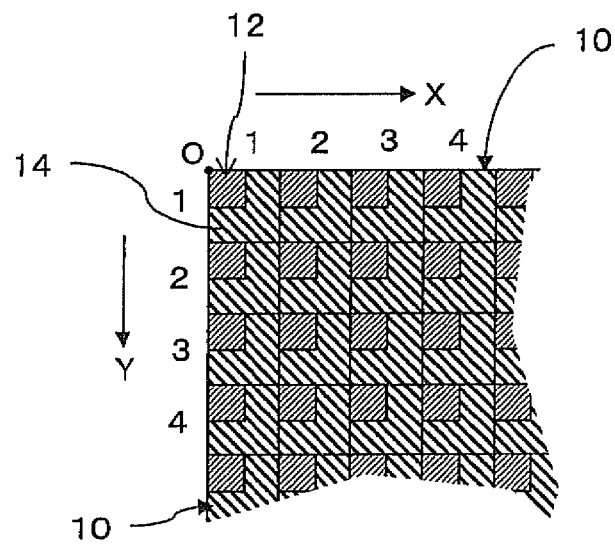
FIG. 3 illustrates an example of a two-dimensional arrangement of the unit region.

A portion of a two-dimensional code pattern image is schematically shown in FIG. 3. With point O at the top left corner of FIG. 3 as the origin of coordinates, a state is shown where the unit regions 10 are arranged in a two-dimensional orthogonal matrix on the x and y axes. If a serial number beginning from 1 is assigned to each unit region 10 along the x axis and the y axis from the origin O in this matrix, the coordinates for each individual unit region 10 can be expressed as a pair of serial numbers along the x and y directions. For example, the coordinates of the unit region 10 at the top left corner in FIG. 3 are (1,1) and the coordinates of the adjacent unit region 10 to the right are (2,1). This coordinate system is referred to as a "pattern coordinate system" for convenience.

It is preferable for the unit region 10 to have a square shape. If the unit region 10 has a rectangular shape, the scales of the coordinates differ between the x direction and the y direction. To convert the lengths obtained in the pattern coordinate system into actual dimensions, the conversion factors for the x direction and for the y direction are different in this case. If the shape is a square, the conversion factors for both the x and y directions can be set to be identical.

As shown in FIG. 1, one unit region 10 composed of a position code image 12 and an identification code image 14.

The position code image 12 is a code image representing positional information. This positional information typically expresses two-dimensional coordinates where the position code image 12 (or the unit region 10 that includes it) is positioned on the code pattern area 22. The coordinates may be of the above-mentioned pattern coordinate system. For example, if the amount of data of the positional information is set to 8 bits in each of the x and y directions, 256 coordinates can be expressed in each of the x and y directions. In this case, if one unit region 10 is, for example, 3 mm×3 mm, a square region having sides of approximately 80 cm can be addressed with 3 mm spacing. In a device for scanning this two-dimensional code pattern image, using the positional information with 3 mm spacing that is decoded from the detected position code image and the information for the position code image within the scanned image allows a scanned position to be identified, for example, at a diagonal pattern pitch of a glyph code, namely, a positional resolution of approximately 0.3 mm.

In this embodiment, the position code image 12 includes not only positional information but also corresponding redundancy data, such as an error detecting code or error correcting code. Although read errors may be inevitable when optically scanning a code pattern image that has been printed, such as on a sheet, adding an error detecting code to the positional information enables a read error to be detected up to the number of bits in accordance with the code length of the error detecting code. Furthermore, if an error correcting code has been added, a read error for the number of bits in accordance with the code length of the error correcting code can be corrected. The use of the error detecting code or the error correcting code should be decided by taking into consideration the purpose of the application of the two-dimensional code pattern image, the amount of data of the positional information, and the amount of data that can be expressed by one position code image 12.

The identification code image 14 is a code image expressing common identification information within the code pattern area 22. The above-mentioned position code image 12 (namely, the positional information it represents) differs with every unit region 10 that is arranged in the code pattern area 22. In comparison, the identification code image 14 (namely, the identification information it represents) is identical at all unit regions 10 that are arranged in the code pattern area 22. Namely, the same identification code image 14 is repeatedly positioned in two dimensions in the code pattern area 22.

A typical example of the identification information is an identification number that uniquely identifies the surface of the sheet. In this case, the values of the identification information expressed by the identification code image 14 printed on one surface of one sheet are all identical. For example, with regard to a notebook that has been printed with different identification code images 14 on every page in this manner, if an handwriting entry is made simultaneously with the entry given in the above-mentioned documents 1 and 2 using a pen fitted with a scanner for scanning the area of the entry, the locus of the entry for a page in the notebook can be recorded as electronic information on the corresponding page of an electronic document corresponding to the notebook.

In another example, identification information for every sheet can be considered. Furthermore, identification information for a booklet (or notebook) formed from multiple sheets.

In yet another example, identification information can be used to uniquely identify a page of an electronic document. This assumes an application where each page of the electronic document is superimposed and printed with a two-dimensional code pattern image. In this case, the identification code image 14 that was scanned from a printed page identifies which page it is from which electronic document. Similarly, identification information can be used to uniquely identify an electronic document. In this case, with respect to the printed result of the multiple pages forming the electronic document, the same identification code image 14 is printed on all pages.

The identification code image 14 is a code image expressing information that combines this sort of identification information and redundancy data, such as a corresponding error detecting code or error correcting code.

In the example of FIG. 1, region of the position code image 12 has the shape of a square or rectangle and is positioned at the top left corner of the unit region 10. The inverted L-shaped region that remains after subtracting the region of the position code image 12 from the unit region 10 is the region for the identification code image 14.

The region of the position code image 12 is not dispersed within the unit region 10 but preferably has a compact shape. If each portion forming the position code image 12 is dispersed over the entire region of the unit region 10, it is necessary to scan the entire unit region 10 for the positional information. However, if the position code image 12 has a compact shape in one part of the unit region 10, the positional information can be detected by scanning only that part. Namely, the position code image 12 preferably has a compact shape so that a small scanning area for the scanner is sufficient. In this respect, the square shape (or a rectangular shape) of the region for the position code image 12 shown in FIG. 1 is preferable. However, the region of the position code image 12 need not have a square or rectangular shape provided the shape is compact. The required scanning area can be reduced from the related art if the region for the position code image 12 within the unit region 10 is at least positioned along either the x axis or the y axis.

Figure 4:
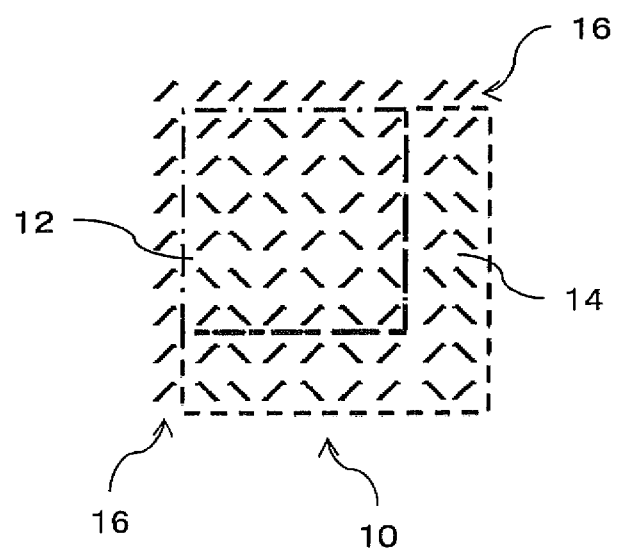
FIG. 4 illustrates an example of a code pattern of the unit region.

Although FIG. 1 showed a schematic diagram, FIG. 4 shows a specific example of a two-dimensional code pattern. This example, developed at the Palo Alto Research Center of the Xerox Corporation, is a two-dimensional code pattern image using a glyph code (for example, Japanese Patent Laid-Open Publication No. Hei 6-103390, Hei 6-75795) as a code symbol for expressing data with diagonals having differing angles.

In this example, the unit region 10 is an 8 symbol×8 symbol square region. The value of each symbol is expressed by the diagonal patterns shown in FIG. 5. In this example, the symbol value of 0 is expressed by a diagonal slanting downward to the right at a counterclockwise angle of 45 degrees with respect to vertical and the symbol value of 1 is expressed by a diagonal slanting upward to the right at a clockwise angle of 45 degrees with respect to vertical.

Among these images, the position code image 12 is a 6 symbol×6 symbol square image at the top left corner of the unit region 10 and the identification code image 14 is an image of an inverted L-shaped region that remains after subtracting the 6×6 symbol square from the unit region 10.

Figure 6:
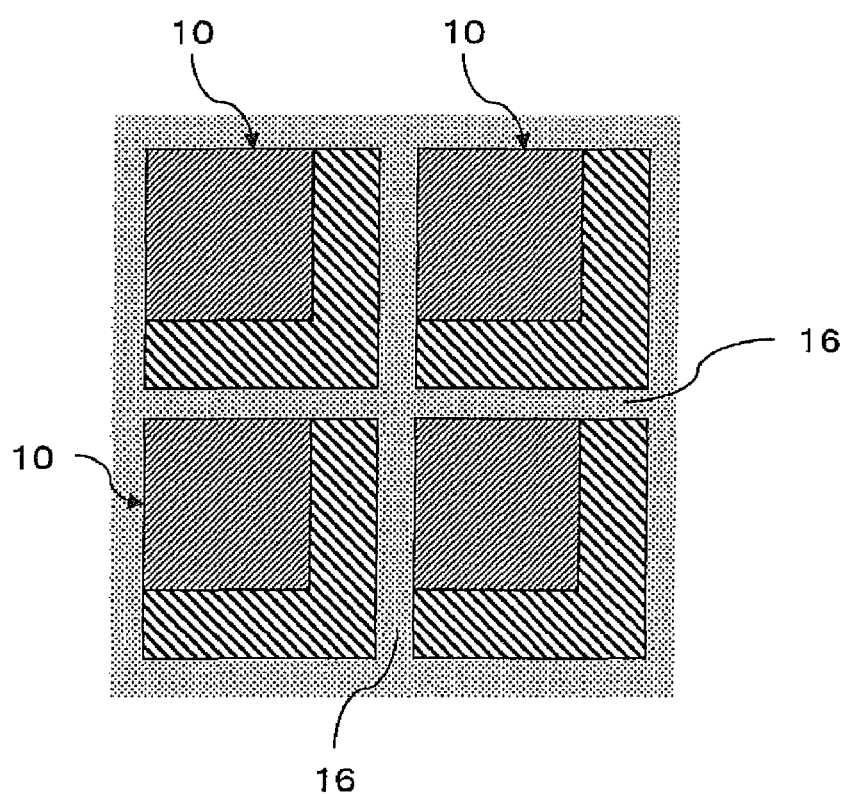
FIG. 6 illustrates an example of a positional relationship between unit regions and synchronizing codes.

Furthermore, in this example, a column and a row for synchronizing codes 16 are provided on the vertical and horizontal directions along the periphery of the unit region 10. In this example, the synchronizing codes 16 are successive diagonal symbols slanting upward to the right ("1") and the symbol size and arrangement spacing are identical to the symbol size and spacing within the unit region 10. As shown in FIG. 6, the synchronizing codes 16 are provided vertically and horizontally at an even spacing and each unit region 10 is provided in a square region that is surrounded by the synchronizing codes 16. The synchronizing codes 16 marks off each unit region 10. Namely, in the device that scans the two-dimensional code pattern image, when rows or columns of successive diagonal symbols slanting upward to the right are detected, the insides of the squares in a grid formed by the rows and columns can be identified as unit regions 10 and the 6×6 symbols at the top left corner of the unit region 10 can be identified as the position code image 12.

The synchronizing codes 16 are not limited to the example shown in FIG. 4 provided they can identify the location of the unit region 10 or the position code image 12. For example, a symbol having a specific shape that differs from the diagonal symbols and is positioned at the four corners of the unit region 10 may be used for the synchronizing codes 16. In the examples of FIG. 4 and FIG. 6, the rows and columns having the width of one symbol for the synchronizing codes 16 were used. However, if the marks forming the synchronizing codes 16 are sufficiently small, the unit regions 10 may be arranged in two dimensions without gaps and the marks may be positioned in the margins of the adjacent unit regions 10.

Figure 5:
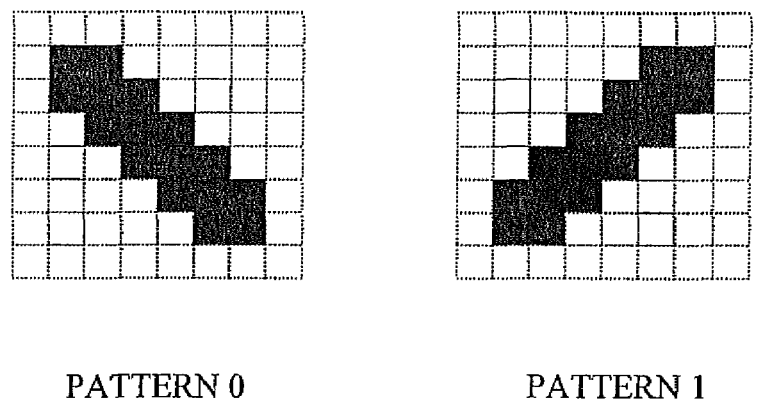
FIG. 5 illustrates an example of a code symbol of a glyph code.

In the example of FIG. 4, one position code image 12 stores 36 symbols, namely, 36 bits of data. Among the 36 bits, 18 bits can be used to encode the x coordinate and 18 bits can be used to encode the y coordinate. If all of both 18-bit coordinates are used to encode the position, $2^{18}$ possible positions (approximately 260,000 positions) can be encoded. If each diagonal pattern is formed from 8×8 pixels as shown in FIG. 5 and printed at 600 dpi (dots per inch), a length in the vertical or horizontal direction of one dot at 600 dpi is 0.0423 mm so that for both the vertical and horizontal directions the height and width of the two-dimensional code (including the synchronizing codes 16) in FIG. 6 is approximately 3 mm (=8 pixels/symbol×9 symbols×0.0423 mm). If 260,000 possible positions are encoded with 3 mm spacing, a length of approximately 786 m can be encoded. If the scanning accuracy is high, all 18 bits can be used to encode the position. However, in practice, it is preferable to include redundancy bits for error detection or error correction. Increasing the number of redundancy bits among the 18 bits increases the error detection or error correction performance but decreases the range of positions that can be expressed.

Furthermore, in the example of FIG. 4, the identification code image 14 is positioned in a 2 bit×8 bit rectangular region or a 2 bit×6 bit rectangular region so that a total of 28 bits of identification information can be stored. If 28 bits are used for identification information, approximately 270 million possible ($2^{28}$) types of identification information can be expressed. However, in practice, it is preferable to use several of the 28 bits as redundancy bits for error detection or error correction.

In the example hereinbefore, one symbol expressed one bit of data by using two diagonal patterns, which are mutually different by 90 degrees. However, this is only one example. For example, if the symbols are added with a vertical line and horizontal line patterns, two bits of information can be expressed with one symbol. In this manner, the number of bits that can be expressed by one symbol can be increased by increasing the number of different angles for the diagonal patterns of one symbol.

If the two-dimensional code pattern image composed in the above-mentioned manner is used, the position code image 12 and the identification code image 14 can be scanned by a scanner having a smaller scanning area than that required in the related art. This effect will be described with reference to FIG. 7A and FIG. 7B.

Figure 7A:
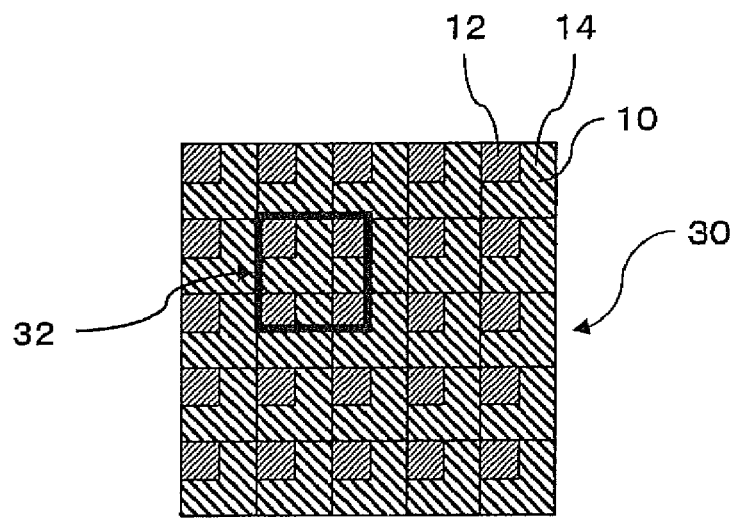
FIG. 7A schematically shows a two-dimensional code pattern image of the embodiment.
Figure 7B:
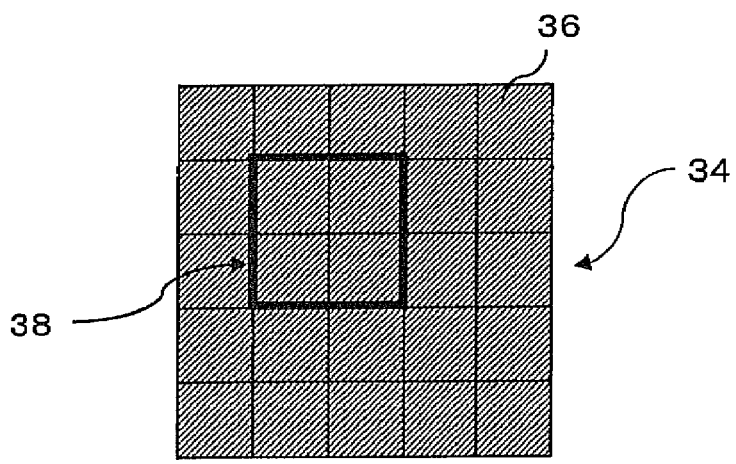
FIG. 7B schematically shows a two-dimensional code pattern image of the related art.

FIG. 7A schematically shows a two-dimensional code pattern image 30 of this embodiment where the position code image 12 and the identification code image 14 are separate within the unit region 10 and FIG. 7B schematically shows a two-dimensional code pattern image 34 of documents 1 and 2 where the positional information and identification information are integrated within a unit region 36.

To obtain positional information in either case, since the positional information differs for every unit region 10 or 36, the scanning region of the scanner has to completely cover at least one region showing positional information. In the case of the conventional pattern shown in FIG. 7B, the scanning region has to completely cover one unit region 36 since the positional information needs to be obtained from information in the entire unit region 36. In theory, if a scanning region 38 can cover a 2 unit region×2 unit region square (strictly speaking, a square that is vertically and horizontally smaller by one symbol), at least one complete unit region 36 can be read regardless of the manner of displacement of the scanning region 38. If rotation of the scanner is taken into consideration, the scanning region of the scanner in this case is a circular region having a diameter equal to the diagonal of the square region 38.

In comparison, in this embodiment, the positional information is unevenly distributed within the position code image 12 so that to completely read the positional information at least one position code image 12 need be read. Thus, as shown in FIG. 7A, the scanner should be able to cover a region 32 that includes two position code images 12 each in the vertical and horizontal directions (strictly speaking, a region that is vertically and horizontally smaller by one symbol). In this manner, in this embodiment, it is desirable for the scanning region of the scanner to be smaller than 2 unit regions×2 unit regions. If the number of bits of the positional information and the identification information, the corresponding number of redundancy bits and the image size of one symbol are identical in FIG. 7A and in FIG. 7B, the unit region 10 and the unit region 36 have the same size. Thus, under the same conditions, it is desirable for the scanning region of the scanner in this embodiment to be smaller than in the related art.

An ideal situation was discussed hereinbefore where there is no inclination of the scanning surface of the scanner. If inclination of the scanning surface is taken into consideration, it is necessary to set a larger scanning region by the amount of the inclination. However, the extent the scanning region is enlarged to take into account the inclination is the same in this embodiment as in the related art so that the scanning region in this embodiment is still smaller as a result.

In this embodiment, if the size of the scanning region of the scanner is set to a small region size close to the limit of covering at least one position code image 12, the identification code image 14 of each unit region 10 included in the scanning region cannot be completely scanned in many cases. However, since the identification code image 14 is the same in all unit regions 10, the identification code image 14 can be reconstructed by appropriately reconstructing the sliced part. Therefore, in this embodiment, both the positional information and the identification information can be scanned even if the scanning region of the scanner is smaller than in the related art. The reconstruction process for the identification code will be described in detail hereinafter.

In this manner, if the scanning region of the scanner can have a smaller size, distortion and focal deviation of an image with an inclined scanning surface of the scanner can be reduced. Therefore, it is possible to decrease the problem of scanning performance deterioration due to distortion and focal deviation.

In the system of document 2, as shown in FIG. 4 of the same document, 2 bytes of positional information and 3 bytes of document page identification information are positioned separately within each individual code image. Although this may seemingly appear to be similar to the embodiment, it is completely different. Namely, in the system of document 2, 4 bytes of error correcting codes are calculated with respect to a total of 5 bytes for the positional information and the document page identification information. The 4 bytes of error correcting codes extend across a range along substantially the entire length of the code image. Thus, the error correcting codes dispersed over a wide range must be read to decode the positional information and to decode the document page identification information. In this manner, since the entire code image must be read to decode the positional information in document 2, the result becomes the same as FIG. 7B.

Next, the configuration of a code pattern image generation apparatus is described with reference to FIG. 8 for generating the two-dimensional code pattern images that were described hereinbefore. This apparatus inputs positional information for each unit region 10 that is positioned within the code pattern area 22 and common identification information at each position from an external apparatus (for example, personal computer or document server).

A positional information encoder 102 encodes the input positional information using a predetermined encoding method. For example, the well-known RS (Reed-Solomon) error-correcting encoding method or BCH encoding method can be used. Furthermore, an error detection encoding method, such as CRC (Cyclic Redundancy Check) or check sum, can also be used. Whether to use either can be decided according to the purpose. The positional information encoder 102 calculates the redundancy bits according to an error correction or error detection method with respect to the positional information and adds them to the positional information for output as the position code. In this encoding process, the sequence of each bit of the positional information may be transposed and a conversion process or encryption process may be performed on the positional information so that the redundancy bits may be obtained for the processed result.

If the symbol used in the code image expresses multiple bits of data with one symbol, a bit string that is output from the positional information encoder 102 can be interpreted as a symbol value of each symbol by delimiting the bit string by the number of bits that can be expressed by one symbol.

Figure 9A:
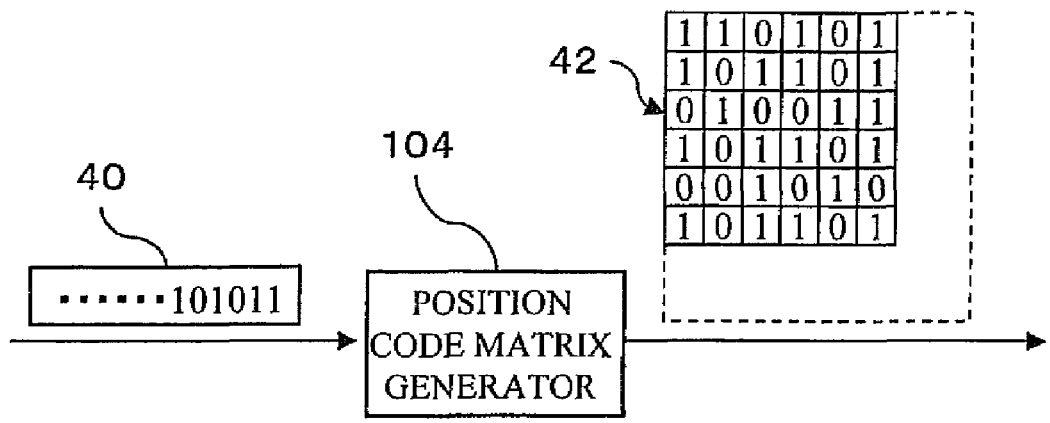
FIG. 9A illustrates a function of the position code matrix generator.

A position code matrix generator 104 arranges each symbol value of position codes output from the positional information encoder 102 into the shape of a two-dimensional matrix in accordance with a symbol arrangement pattern of the position code image 12 in the unit region 10. Namely, as shown in FIG. 9A, position codes 40 that are input by the position code matrix generator 104 are serial data of a string of symbol values. However, the position code matrix generator 104 converts them, for example, into a 6×6 position code matrix 42 as a preliminary process for conversion to the position code image 12 shown in FIG. 4. Strictly speaking, the position code matrix 42 is the 6×6 part of the top left corner of the two-dimensional code matrix of the 8×8 unit region 10. Mapping rules indicating the mapping of each symbol value in the serial position codes 40 to a specific row and column of the position code matrix 42 are determined in advance in a system utilizing the two-dimensional code pattern images of the embodiment and may be registered in the position code matrix generator 104.

An identification information encoder 106 encodes the input identification information using a predetermined encoding method. The same encoding method used in the positional information encoder 102 may be used.

Figure 9B:
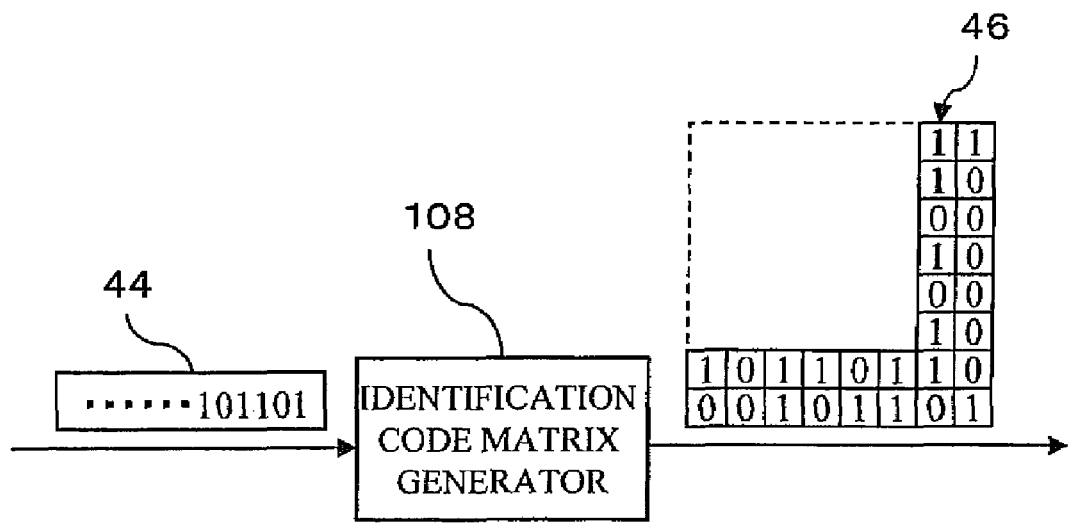
FIG. 9B illustrates a function of the identification code matrix generator.

As shown in FIG. 9B, an identification code matrix generator 108 positions the serial identification codes 44 output from the identification information encoder 106 into two dimensions according to predetermined mapping rules to generate the identification code matrix 46 in accordance with the symbol arrangement of the identification code image 14 shown in FIG. 4.

Since the positional information differs for every unit region 10 in the above-mentioned configuration, the positional information encoder 102 and the position code matrix generator 104 obtain the position code matrix 42 for the respective positional information. In comparison, since the identification information is common even if the position is different, the identification information encoder 106 and the identification code matrix generator 108 obtain the identification code matrix 46 for a single unit of identification information.

A code positioning section 110 respectively positions the position code matrix 42 corresponding to the respective positional information and the identification code matrix 46 corresponding to the identification information to corresponding positions in the code pattern area 22 to generate a two-dimensional code matrix corresponding to the size of the two-dimensional code pattern image to be output. In this process, the position code matrix 42 of the respective positional information is respectively positioned at the coordinates given by the corresponding positional information and the identification code matrix 46 having the same identification information is positioned adjacent to each position code matrix 42 of respective positional information. Or, for every position, the square position code matrix 42 and the inverted L-shaped identification code matrix 46 are combined to create a code matrix for the unit region 10 and the code matrix for the unit region 10 for each position is positioned at the respective corresponding position so that a two-dimensional code matrix is generated for the overall pattern. If the two-dimensional code pattern image is included with synchronizing codes 16, the code positioning section 110 inserts a row and column of codes corresponding to the synchronizing codes 16 between the code matrices of the unit regions 10. However, this is not essential since the synchronizing codes 16 have a known pattern arrangement so that they can be inserted by a code pattern image generator 114 to be described hereinafter.

A pattern storage section 112 stores bit-mapped pattern images corresponding to the respective symbol values as shown in FIG. 5.

The code pattern image generator 114 generates a two-dimensional code pattern image by replacing each symbol value in the two-dimensional code matrix, which was created by the code positioning section 110, with a pattern image corresponding to the symbol value and acquired from the pattern storage section 112. If it is necessary to insert the synchronizing codes 16, for example, the pattern image corresponding to each symbol value of the two-dimensional code matrix may be arranged in the space within each grid of the image for the synchronizing codes 16 prepared in advance.

The two-dimensional code pattern image generated in this manner can be supplied to and printed out by a printer, copying machine, multifunction machine, or the like.

Figure 8:
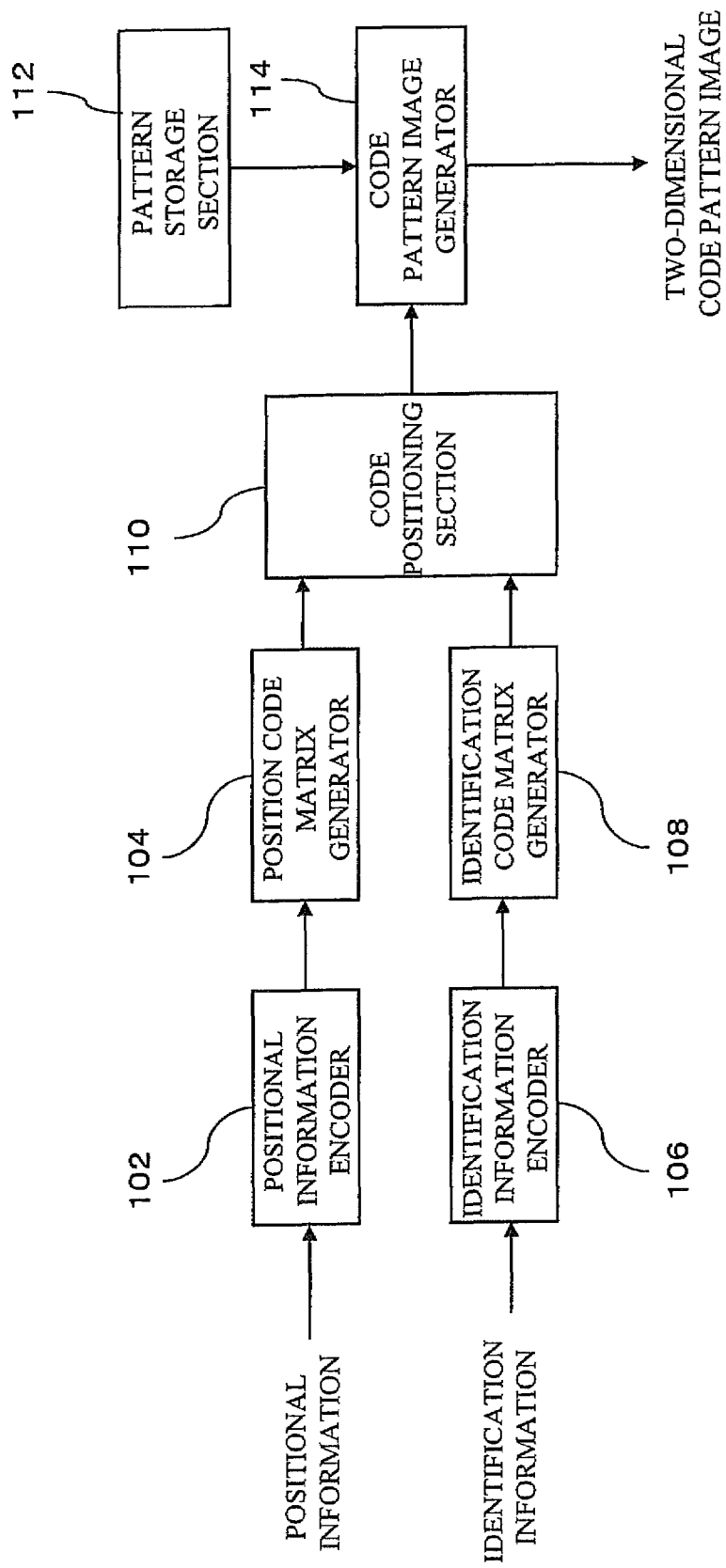
FIG. 8 shows a configuration of an apparatus for generating the two-dimensional code pattern image of the embodiment.

The code pattern image generation apparatus of FIG. 8 can be implemented by having a computer processor execute a program that has been described with the functions of the sections 102 to 114 as described hereinbefore. Furthermore, the functions of sections 102 to 114 are relatively simple and can therefore be implemented in part or in whole as hardware circuits. Moreover, the sections 102 to 114 can also be implemented in part or in whole by the use of a DSP (Digital Signal Processor), which is an arithmetic processing unit that uses both hardware circuits and software.

Next, two modifications of the code pattern image generation apparatus will be described with reference to FIG. 10 and FIG. 11. Component parts in FIG. 10 and FIG. 11 corresponding to the parts shown in FIG. 8 are given the same reference numerals and their descriptions will be omitted.

Figure 10:
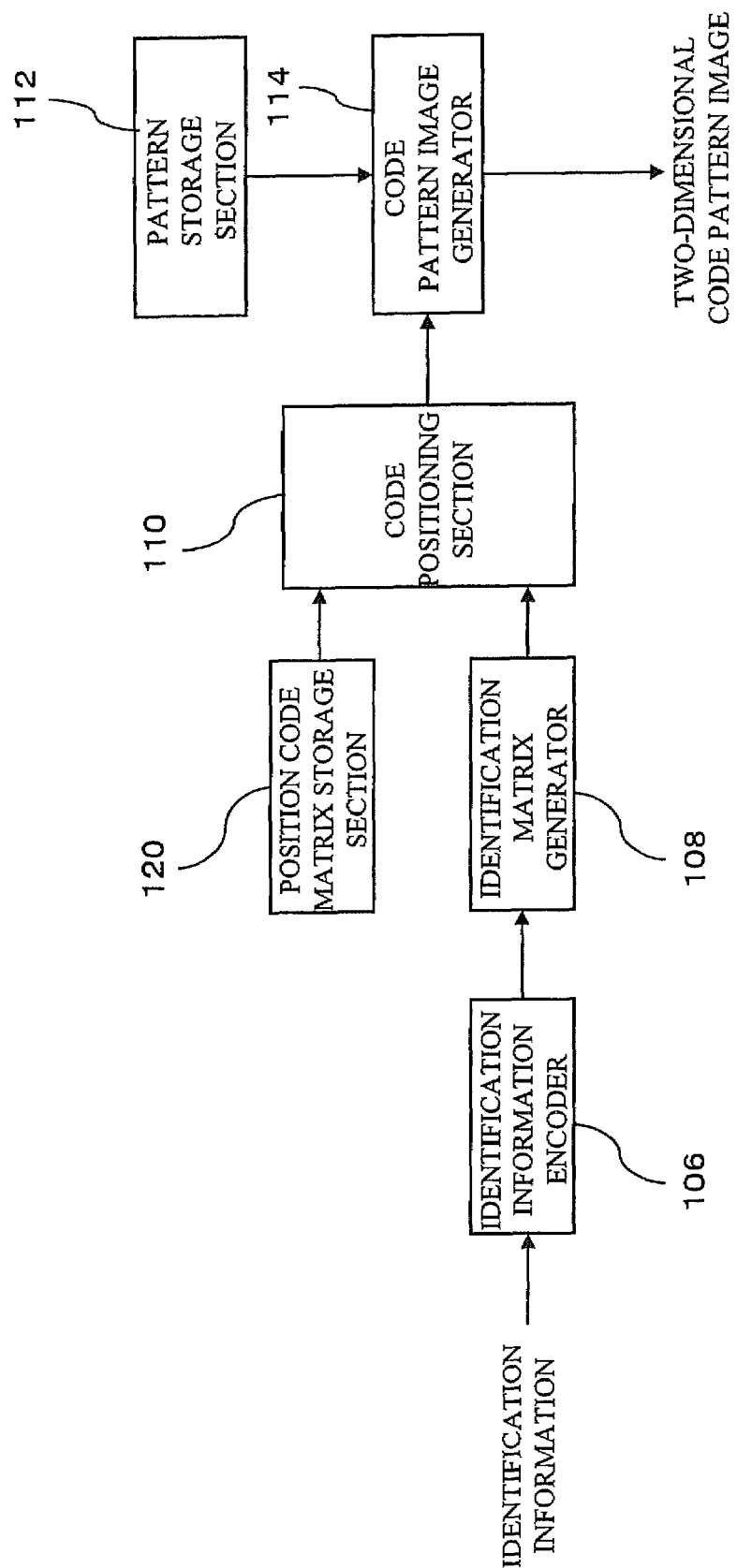
FIG. 10 shows another example configuration of the code pattern image generation apparatus.

FIG. 10 shows a configuration in which a position code matrix storage section 120 is provided instead of the positional information encoder 102 and the position code matrix generator 104.

Positional information basically remains the same regardless of image changes. For example, if the origin of the positional information is positioned at the top left of an image, the positional information that is positioned at the top left of the image is the same (for example, x coordinate 0, y coordinate 0), regardless of the image. Therefore, a set of position code matrices to be used in the two-dimensional code pattern image is generated in advance and stored in the position code matrix storage section 120. Then, if the stored position code matrices are used when actually generating the two-dimensional code pattern, the load during image generation can be reduced. It is desirable to store into the position code matrix storage section 120 the position code matrix corresponding to, for example, coordinates, with the coordinates as indexes.

Figure 11:
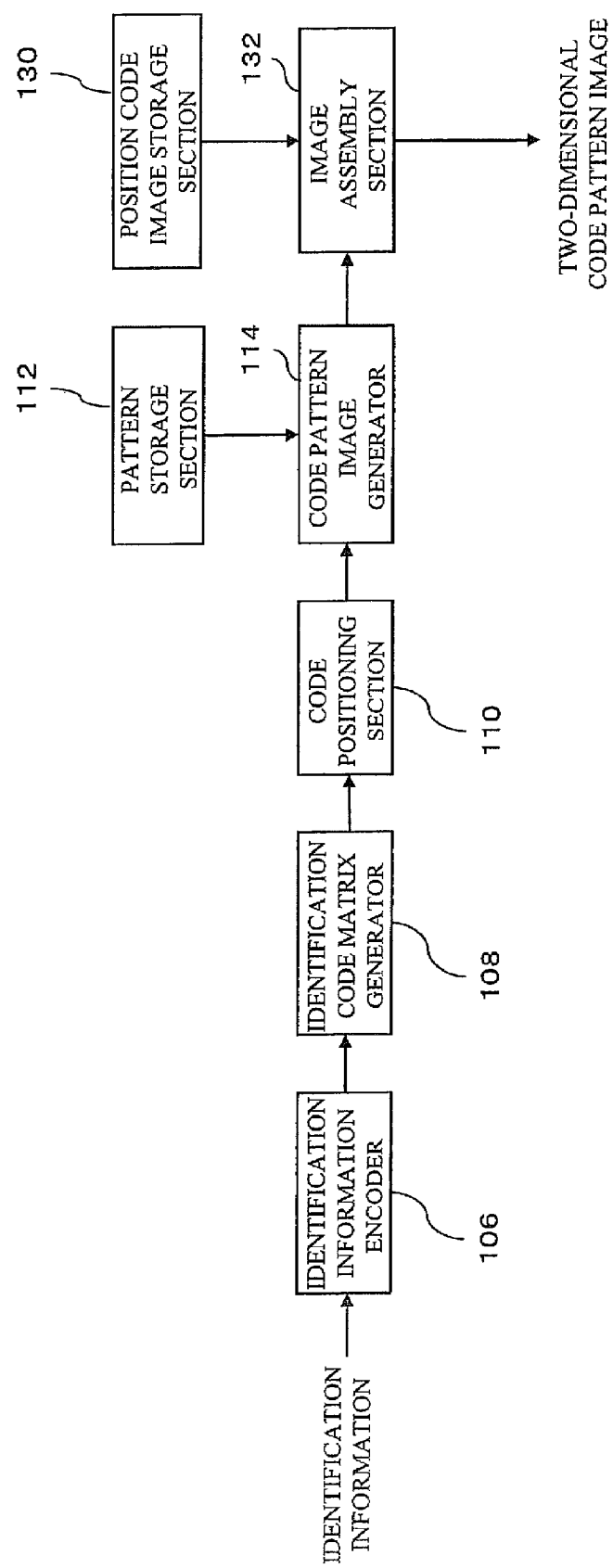
FIG. 11 shows yet another example configuration of the code pattern image generation apparatus.

FIG. 11 is an example of preparing in advance the position code image 12 itself and not the position code matrix. Position code images that have a possibility of being used are stored, for example with coordinates in a position code image storage section 130. In this configuration, the code positioning section 110 positions only the identification code matrix generated by the identification code matrix generator 104 at a position where the code pattern area is required. The code pattern image generator 114, which receives this positioning result, generates a code pattern image only for the identification code portion. An image assembly section 132 assembles the position code image at each coordinate taken from the position code image storage section 130 in the space corresponding to each coordinate for the code pattern image of the identification code portion. An image may be stored in the position code image storage section 130 where each position code image is positioned at each coordinate position and only the identification code image portion is left blank, and this may be combined with the output image of the code pattern image generator 114.

The positional information has an extremely large number of items since the information differs according to each position within a page. In comparison, the identification information has an extremely small number of items, for example, at one information item per page. Therefore, the configurations shown in FIG. 10 and FIG. 11 greatly reduce the processing for the positional information and are extremely advantageous due to the reduction in processing load.

Next, a code pattern image scanning apparatus for scanning two-dimensional code pattern images of this embodiment will be described.

Figure 12:
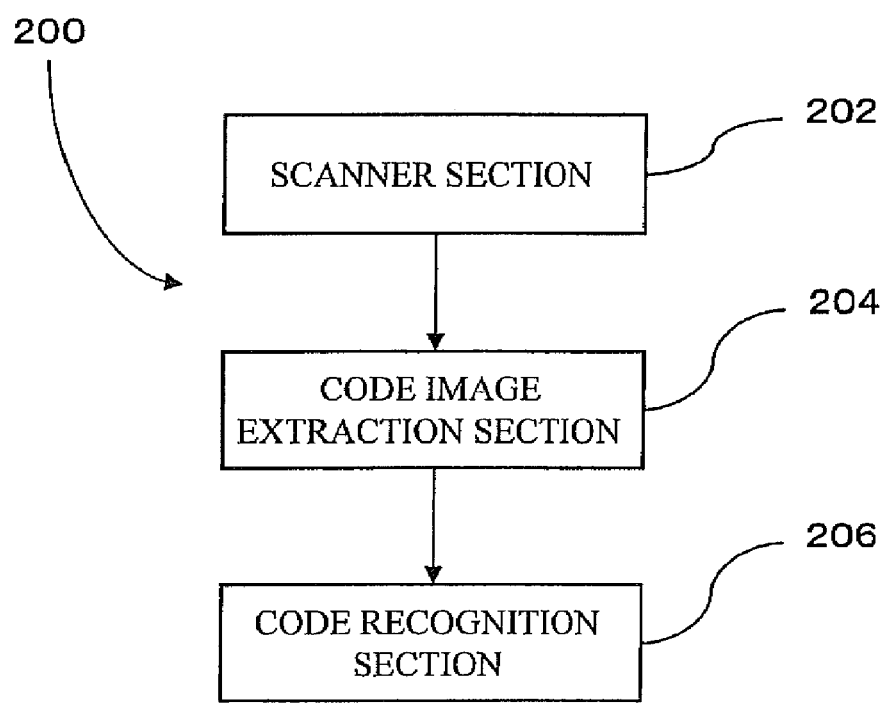
FIG. 12 shows a configuration of a code pattern image scanning apparatus of the embodiment.

As shown in FIG. 12, a code pattern image scanning apparatus 200 is composed of a scanner section 202, a code image extraction section 204, and a code recognition section 206.

The scanner section 202 is a scanner for optically scanning a two-dimensional code pattern image that has been printed on a medium. As shown in FIG. 7A, the scanner section 202 has a scanning area that covers at least 2×2 position code images 12 with inclination taken into consideration. The scanner section 202 is typically a pen with scanner in which are integrated a pen and a scanner as shown in documents 1 and 2 or a pen-type scanner. The scanner section 202 scans images in the scanning range at a high frame rate, for example, of approximately several tens to hundreds frames per second.

The code image extraction section 204 extracts the position code image 12 and the identification code image 14 from the image (referred to as a scanned image) that was scanned by the scanner section 202. The processing of the code image extraction section 204 is described with reference to FIG. 13. The scanned image that is input by the code image extraction section 204 is assumed to have already been corrected for distortion in accordance with the inclination of the scanner section.

When the scanned image is acquired (S1) from the scanner section 202, the code image extraction section 204 detects (S2) the synchronizing codes 16 from within the scanned image. In the case of the code pattern shown in FIG. 4, the row and the column having successive diagonal patterns slanting upward to the right are detected as the row and the column of the synchronizing codes 16. Various synchronizing codes that have been proposed in the past except the example in FIG. 4 can be used and can be detected by a detection method of the related art to match the type of synchronizing code.

When the synchronizing codes 16 can be detected, the position of the position code image 12 can be specified with the grid of the synchronizing codes 16 as a reference. For example, in the examples of FIG. 4 and FIG. 6, the region of 6×6 symbols on the top left corner of a square in the grid formed by the synchronizing codes 16 can be specified as the region for the position code image 12. The code image extraction section 204 detects (S3) the complete position code image 12 from each region within the scanned image where the position code image 12 should exist.

Figure 14:
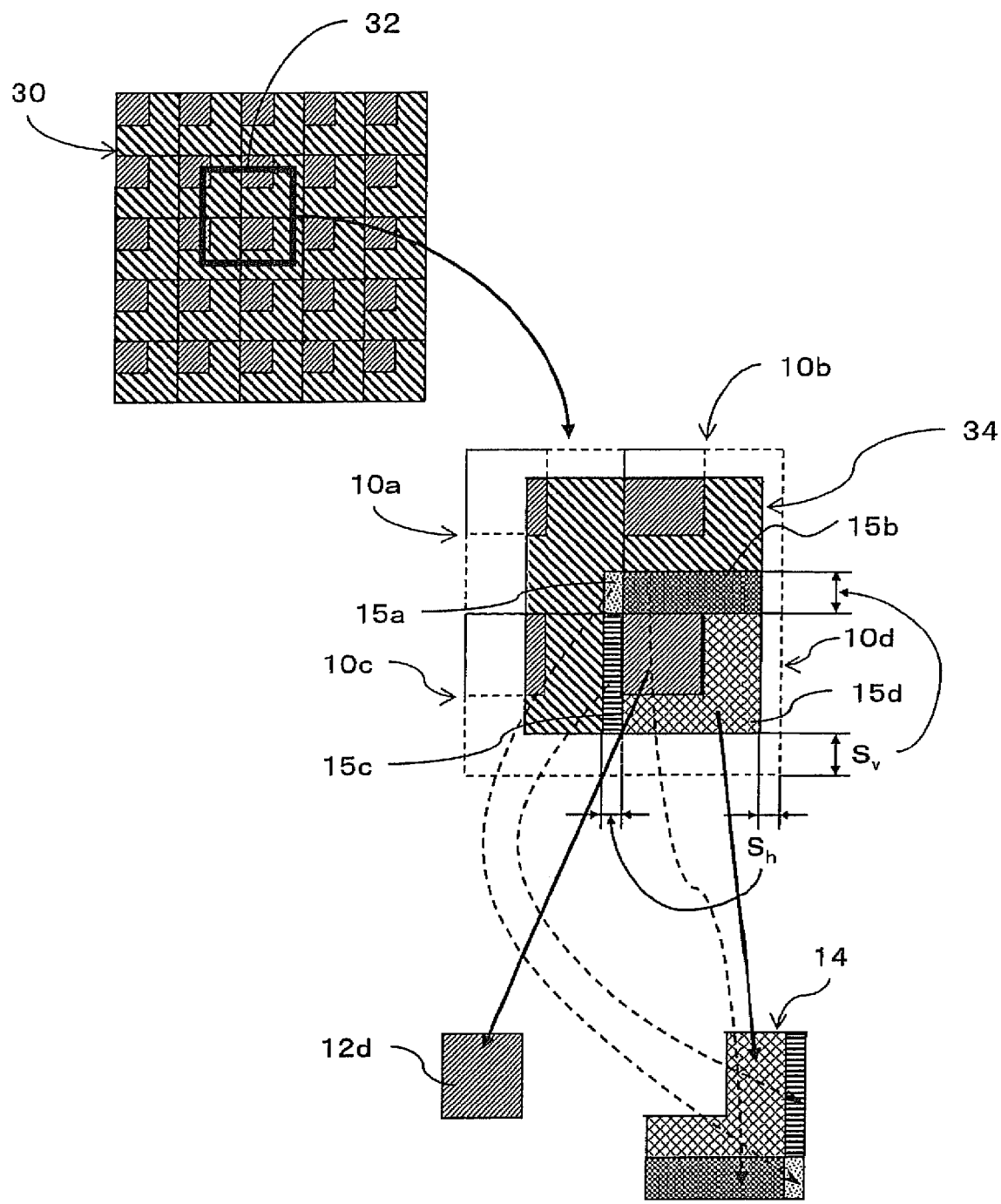
FIG. 14 illustrates the reconstruction process for the identification code image by the code pattern image extraction section.

The description of this detection with reference to FIG. 14 assumes the scanner section 202 has scanned the region 32 within the two-dimensional code pattern image 30. As shown at the bottom right of the two-dimensional code pattern image 30 in the figure, the scanned image that is obtained at this time includes part of each of unit regions 10a, 10b, 10c, 10d. Since the scanning area has been appropriately provided, the scanned image 34 is certain to include one complete position code image 12. In the example of FIG. 14, a position code image 12d of the unit region 10d has been scanned intact. The ranges of the unit regions 10a, 10b, 10c, 10d can be specified from the synchronizing codes 16 and the ranges of the respective position code images can be specified so that in step S3 the ranges of the respective position code images within the scanned image 34 are checked and the square regions of 6×6 symbols, which is the size of the position code image 12, having image data (position code image 12d) are detected.

Next, the code image extraction section 204 extracts (S4) the identification code image 14 from the region of the unit region 10d, which is the same as the complete position code image 12d that was detected in step S3. In this example, the identification code image does not exist within the unit region 10d of the scanned image 34 and only a part 15d can be extracted.

The code image extraction section 204 calculates (S5) a shortage for the overall identification code image 14 of the part 15d of the identification code image that was extracted from within the unit region 10d. In the example of FIG. 14, an insufficient length Sh in the horizontal direction and an insufficient length Sv in the vertical direction are respectively calculated. This calculation is possible since the range of the unit region 10d can be specified from the synchronizing codes 16.

Next, the code image extraction section 204 acquires (S6) images 15a, 15b, 15c of the insufficient parts of the identification code image 14 from adjacent unit regions 10a, 10b, 10c by using information on the shortage that was determined. Since the identification code image 14 is identical in all unit regions 10, the insufficient portion in unit region 10d can be acquired from the corresponding position in the other unit regions 10a, 10b, 10c. For example, the image 15a having a rectangular region of height Sv from the bottom edge and width Sh from the right edge of the region of the identification code image 14 of the unit region 10a is cropped.

The code image extraction section 204 respectively arranges the images 15a, 15b, 15c that were acquired in step S6 to appropriate positions with the image 15d so that the complete identification code image 14 is reconstructed (S7).

In the aforementioned manner, the position code image 12 and the identification code image 14 are extracted from the scanned image 34. The code recognition section 206 performs a code recognition process for the position code image 12 and the identification code image 14 to generate positional information and identification information. In general terms, the code recognition process performed here is the reverse of the process to create the two-dimensional code pattern image that was described using FIG. 8. When the identification code image 14 is typically described, the code recognition section 206 first recognizes each diagonal symbol from the identification code image 14 to obtain the value of each symbol and to obtain the identification code matrix where the value of each symbol is set and arranged to the arrangement position for each symbol within the identification code image 14. Then, a serial identification code is obtained for this identification code matrix by performing a process that is the reverse of the identification code matrix generator 108, a decoding process corresponding to the encoding method of the identification information encoder 106 is performed for this identification code to decode the identification information. The positional information can be decoded by a similar process also for the position code image 12.

The code image extraction section 204 and the code recognition section 206 perform the above-mentioned extraction and recognition processes for every frame to determine the positional information and identification information.

The positional information and the identification information that were obtained in this manner from the scanned image of each frame are utilized by being supplied to application software that uses this information. For example, in the case of an application program that inputs what the user has written with the scanner with pen as electronic information for a sheet that has been printed with the two-dimensional code pattern image of the embodiment, processes are performed where the sheet is specified from the identification information and the data of original image of the sheet is acquired, the locus or track of the user handwriting is determined from the positional information that was acquired from successively scanned frames and an image showing the locus is superimposed on the original image and stored.

Next, another example of a procedure for the code image extraction section 204 will be described with reference to FIG. 15 and FIG. 16. In this process, the code image extraction section 204 acquires (S11) a scanned image from the scanner section 202 and detects (S12) the row and column of synchronizing codes 16 from the scanned image. Next, according to the synchronizing codes, indexing is performed (S13) on the symbol matrix of the scanned image. Namely, since the number of symbols in the vertical direction and in the horizontal direction of the unit region 10 is known and the borders in the vertical direction and in the horizontal direction of each unit region 10 can be identified by the synchronizing codes 16, index numbers are assigned according to a fixed rule for each row and each column of symbols within each unit region 10 in step S13. In the example of the code pattern image of FIG. 4 having 8 symbols×8 symbols, index numbers of integers 1-8 are sequentially assigned to each row and to each column. The result of this index number assignment is schematically shown in FIG. 16. The index in the horizontal direction is assigned numbers 1, 2, . . . , 8 for every symbol width from the left edge to the right edge of the unit region 10 and the index in the vertical direction is assigned numbers 1, 2, . . . 8 for every symbol width from the top edge to the bottom edge of the unit region 10. The intersection of the row and column of the synchronizing codes 16 is assigned an index of "0".

Figure 13:
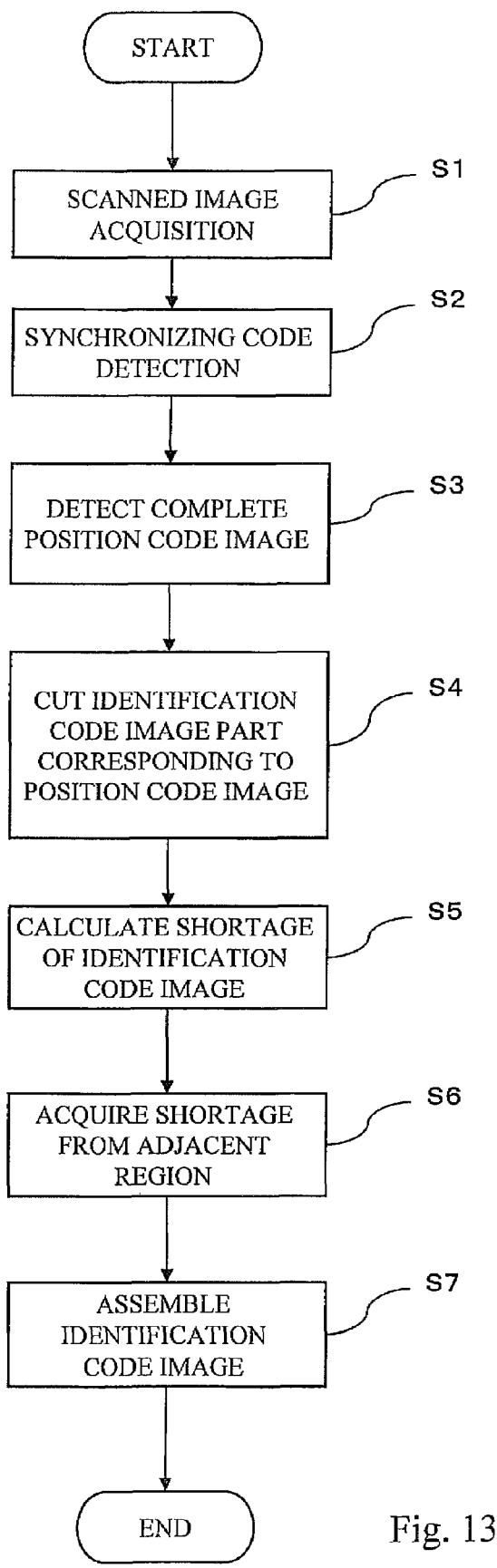
FIG. 13 is a flowchart showing a procedure for the code pattern image extraction section.

Similar to the process of FIG. 13, the code image extraction section 204 detects (S14) the complete position code image 12 from the image within the scanning region 32 and reconstructs (S15) the identification code image 14 by using the index. Namely, all the identification code images are the same so that the same symbol exists at positions having the same combination of vertical index and horizontal index. The identification code image 14 is a collection of symbols having combinations of vertical indexes 1-6 and horizontal indexes 7-8 and symbols having combinations of vertical indexes 7-8 and horizontal indexes 1-8. Therefore, in step S15, the symbols of the combinations of horizontal and vertical indexes corresponding to the region for the identification code image are cropped from the image of the scanning region 32 and assembled according to the horizontal and vertical indexes so that the identification code image 14 can be reconstructed. In this process, for example, while sequentially raster scanning the symbols of the image of the scanning region 32 from the top left corner, if any symbol matches the index combination corresponding to the region of the identification code image 14, the image for that symbol is cropped and positioned at a two-dimensional position indicated by the index combination in an image buffer. This process is repeated until the symbol images corresponding to all the combinations of horizontal and vertical indexes required to complete the identification code image 14 are in the image buffer.

Figure 15:
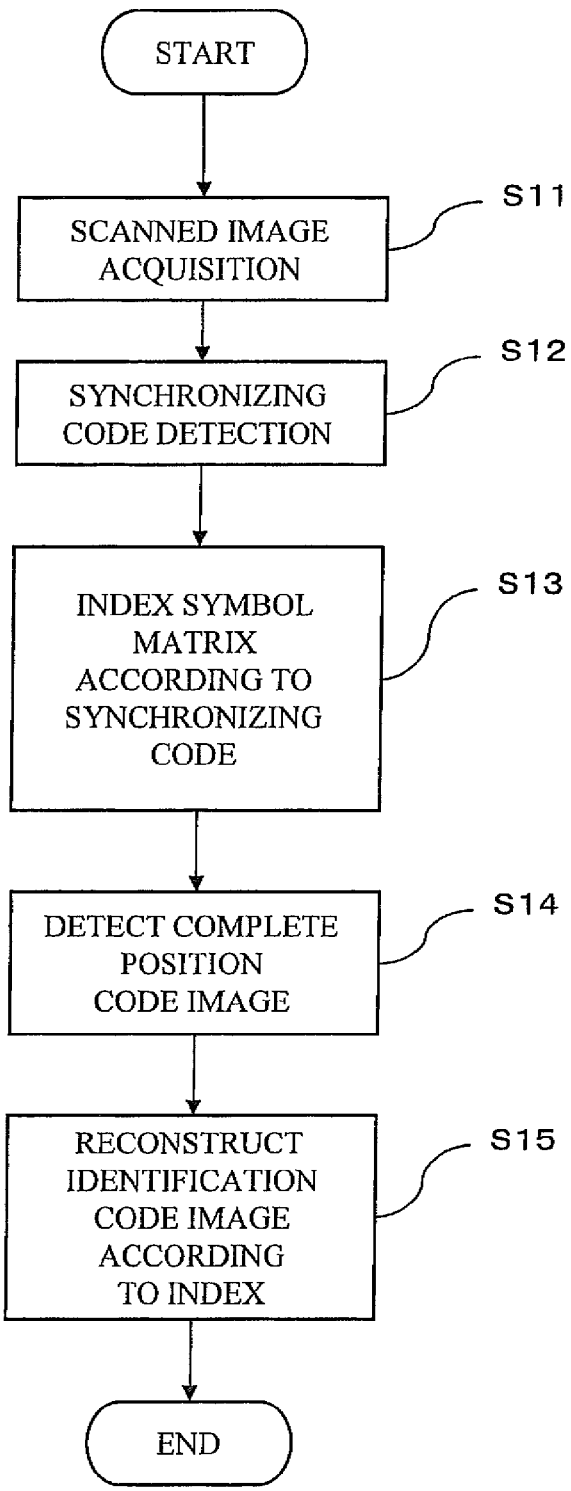
FIG. 15 is a flowchart showing another example of a procedure for the code pattern image extraction section.
Figure 16:
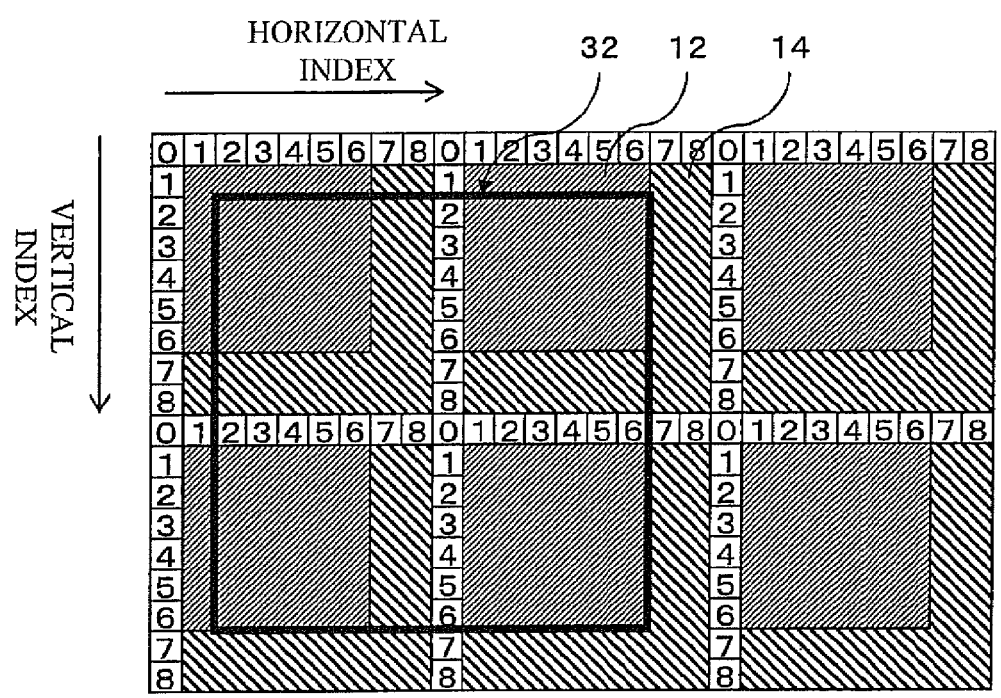
FIG. 16 illustrates another example of the reconstruction process for the identification code image.

As described hereinbefore, the process of FIG. 15 can also extract the position code image 12 and the identification code image 14.

In the examples of FIG. 13 and FIG. 15, the code image extraction section 204 extracted the bit-mapped position code image 12 and identification code image 14. Instead, however, it should be clear to a person skilled in the art that by first recognizing each diagonal symbol within the scanned image 34, the scanned image 34 may be converted into a two-dimensional matrix of symbol values from which the synchronizing codes, the position code matrix, and the identification code matrix may be detected. In this case, the code recognition section 206 need not perform recognition of the symbol images and should perform the reverse processes of the position code matrix generator 104, positional information encoder 102, identification code matrix generator 108, and identification information encoder 106.

The code image extraction section 204 and the code recognition section 206 described hereinbefore can, for example, be implemented by having a computer processor execute a program that has been written with the functions of the sections described hereinbefore. Furthermore, the functions of sections 204 and 206 are relatively simple and can therefore be implemented in part or in whole as hardware circuits. Furthermore, the sections 204 and 206 can also be implemented in part or in whole by the use of a DSP (Digital Signal Processor), which is an arithmetic processing unit that uses both hardware circuits and software.

The reconstruction processes for the identification code image (or the identification code matrix) described hereinbefore can be said to all utilize the relative positional relationship of the identification code image with respect to the position code image and knowledge regarding the repeating characteristic of the identification code symbol in the two-dimensional code pattern image.

As described hereinbefore, the code pattern image scanning apparatus of the embodiment can reconstruct the identification code image 14 by pasting the scanned results of the scanned portions from different unit regions even though the identification code image 14 could not be completely scanned. Even though the scanning range of the scanner section 202 is reduced to just completely scan the position code image 12, the position code image 12 can be scanned and decoded.

Figure 17:
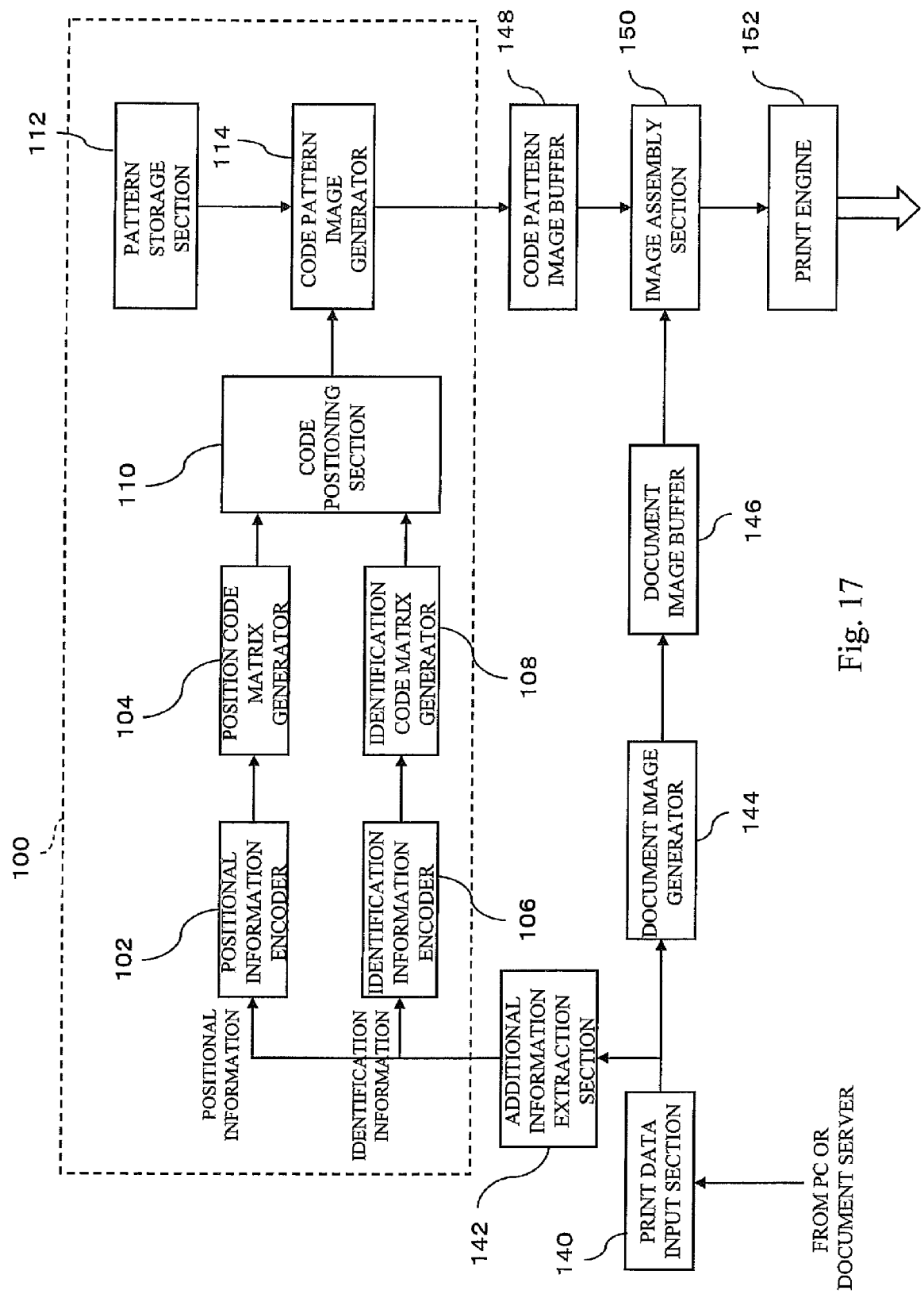
FIG. 17 is a functional block diagram of the image processing apparatus for superimposing the two-dimensional code pattern image on the electronic document.

Next, the image processing apparatus for superimposing the two-dimensional code pattern image of the embodiment on an electronic document will be described using FIG. 17. In FIG. 17, the code pattern image processor 100 has the same configuration as the apparatus shown in FIG. 8 and its description will be omitted.

In the apparatus of FIG. 17, a print data input section 140 inputs print data transferred from a host device, such as a personal computer or document server. The print data is data in which the document image to be printed is written in a page description language or the document image data itself and includes additional information except the content of the document, such as attribute information for the document. In this example, the additional information includes the positional information and identification information that are to be embedded in the two-dimensional code pattern image. For example, the positional information for each point to be embedded within a page for every page of sheet to be printed is added as additional information for every page and transmitted by the host device. Regarding the identification information, for example, when adding identification information that differs for every page of sheets to be printed, identification information is respectively added as additional information by the host device to each page of the print data. As another example, when adding identification information in document units, the identification information is added as additional information for the overall document of the print data. An additional information extraction section 142 extracts the positional information and identification information from the print data. The code pattern image processor 100 performs a process similar to that of the apparatus of FIG. 8 by using the extracted positional information and identification information to generate a two-dimensional code pattern image to be printed on each sheet. The generated two-dimensional code pattern image is initially stored in a code pattern image buffer 148 for timing adjustment.

A document image generator 144 converts the print data to image data by a known page description language interpretation process when the data is in a page description language or uses the print data when the data is image data and performs color space conversion on the image data as well as other required image processes to generate image data for the document for supply to a print engine 152. The generated document image data is initially stored in a document image buffer 146 for timing adjustment.

When the image for one page accumulates respectively in the code pattern image buffer 148 and the document image buffer 146, an image assembly section 150 combines both images. In this assembly process, for example, the plane or plane group of the document image and the plane of the two-dimensional code pattern image are combined to generate image data formed from multiple planes.

In one preferred example, the two-dimensional code pattern image is printed on a medium by using a color material that has a property of absorbing more light at the wavelength of a specific infrared region, although not easily discernable to the human eye (namely, practically invisible), than at the wavelength of the visible light region. In comparison, the document image is printed on the medium by using a color material that hardly absorbs light at the wavelength of the specific infrared region and greatly absorbs light at the wavelength of the visible light region. The yellow, magenta, and cyan toners used in xerography systems essentially do not absorb light at the wavelength in the infrared region and therefore can be used as color materials for document image printing. In this example, the images are combined with the document image as the plane to be transferred to a visible color material channel of the print engine 152 and the two-dimensional code pattern image as the plane to be transferred to an infrared absorbing color material channel of the print engine 152.

The print engine 152 prints the image that is provided from the image assembly section 150 onto a medium, such as a sheet. Thus, a printed material can be obtained on which the image of the electronic document and the two-dimensional code image are superimposed and printed. In this example, in comparison to the document image on the printed material hardly absorbing the infrared light of the specific wavelength region, the two-dimensional code pattern image greatly absorbs the infrared light of the specific wavelength region. Thus, for the scanner section 202 of the code pattern image scanning apparatus (refer to FIG. 12), by using a scanner that scans images using infrared light of the specific wavelength region, the two-dimensional code pattern image can be scanned without almost no influence from the document image.

Although an example was given where the color material for the two-dimensional code pattern image absorbs invisible infrared light, the color material is not limited to this. For example, an image may formed by printing the two-dimensional code pattern image using carbon black to absorb light at the wavelength of the infrared region and the document image using the yellow, magenta, and cyan color materials (normally having low light absorption in the infrared region). In this case, the black and gray colors in the document image may be expressed by combining the colors of yellow, magenta, and cyan. Although the code pattern image becomes slightly dark in this system, this is not enough to prevent scanning of the document image since the code pattern image is dispersed and positioned with only small diagonals and dots. This system is advantageous in that the printed material, in which the two-dimensional code pattern image and the electronic document are superimposed, can be generated without newly adding a print engine for invisible color materials to an existing xerography system. Although a preferable system uses infrared light to scan the two-dimensional code pattern image, this is not essential. However, it is preferable to use light outside the visible light region to scan the two-dimensional code pattern image so that the image of the electronic document is not a hindrance.

In the example of FIG. 17 described hereinbefore, the identification information and the positional information were included in the print data sent from the host device. However, these types of information may be generated within the apparatus of FIG. 17. For example, in the case where unique positional information is used within the page, the set of positional information to be embedded in the page is decided when the page size is decided so that the code pattern image generator 100 can generate the set of positional information to be embedded in each page from the information on page size extracted by the additional information extraction section 142. Furthermore, the identification information may be automatically generated by the code pattern image generator 100. For the automatically generated identification information, for example, a serial number to be provided in the order of the output pages or a hash value having sufficient length for the image on each page can be adopted. Furthermore, identification information to be embedded in the two-dimensional code pattern image together may be automatically generated together with the file name or user name for the electronic document, attribute information for document creation date and time, identification information for the device itself (for example, IP address or MAC address), attribute information relating to the creation of the two-dimensional code pattern image, such as the creation date and time of the two-dimensional code pattern image, and so forth. When the identification information is automatically generated, the image processing apparatus of FIG. 17 maps and stores for subsequent use the identification information and the original electronic document data (or identification information, such as the URL specifying the electronic document) into a database for self-management or a management database provided on the network.

Next, another example of the image processing apparatus for superimposing the two-dimensional code pattern image on the electronic document will be described with reference to FIG. 18. In this example, the configuration of FIG. 10 is used as a mechanism to generate the two-dimensional code pattern image. Component parts in FIG. 18 corresponding to the parts shown in FIG. 17 and FIG. 10 are given the same reference numerals and their descriptions will be omitted.

Figure 18:
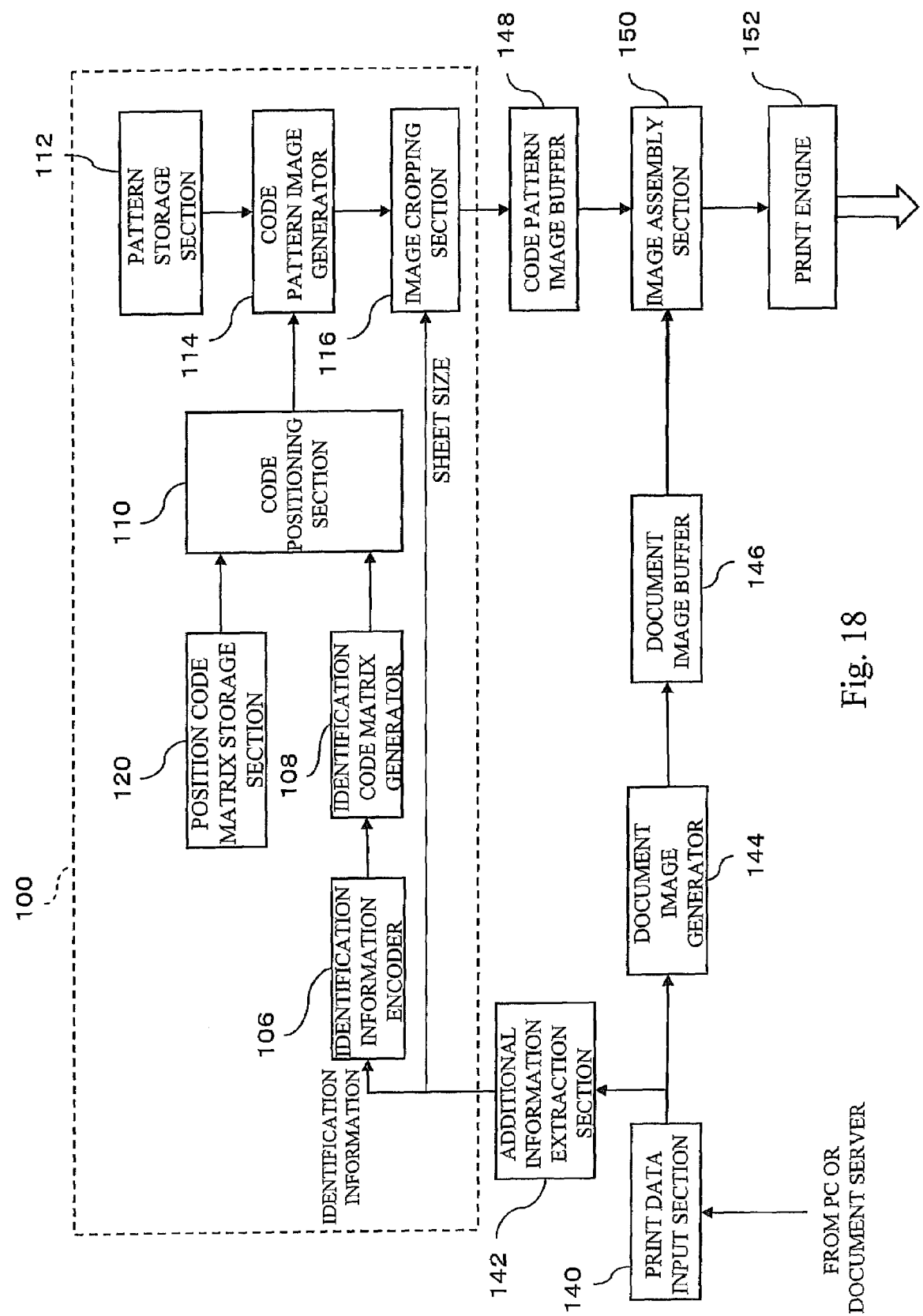
FIG. 18 is a functional block diagram showing another example of the image processing apparatus for superimposing the two-dimensional code pattern image on the electronic document.

The code pattern image generator 100 in the apparatus of FIG. 18 adds the image cropping section 116 to the configuration of FIG. 10.

In this apparatus, the position code matrix storage section 120 stores the position code matrix for each coordinate for the region corresponding to the maximum sheet size the apparatus handles and the code positioning section 110 positions the position code matrix for all coordinates into the region and repeatedly positions the identification code matrix therebetween. Then, the code pattern image generator 114 replaces each symbol in the arrangement with the corresponding image pattern to generate the two-dimensional code pattern image. The image cropping section 116 crops a portion having the actual printing size on the sheet from the two-dimensional code pattern image on the basis of information on sheet size extracted from the print data by the additional information extraction section 142. An area with the vertical and horizontal lengths of the code pattern region in accordance with the sheet size may be cropped vertically and horizontally from an origin, such as the top left corner of the two-dimensional code pattern image. The subsequent process is identical to that for the apparatus of FIG. 17.

Instead of providing the image cropping section 116 in stage after the code image pattern generator 114, the following modification can be considered. Namely, a cropping section is provided between the code assembly section 110 and the code pattern image generator 114 and the cropping section crops a portion corresponding to the sheet size from the large-sized two-dimensional code matrix that was generated by the code assembly section 110. Furthermore, in another modification example, the information on the sheet size is supplied to the code assembly section 110 and the code assembly section 110 fetches and arranges the position code matrix having the respective coordinates corresponding to the sheet size from the position code matrix storage section 120.

Furthermore, when using the configuration of FIG. 11 as a mechanism for generating the two-dimensional code pattern image, similar to the example of FIG. 18, a two-dimensional code pattern image having a region larger than the sheet size can be generated by the code pattern image generator 114 and the portion corresponding to the sheet size can be cropped and printed.

Next, the configuration of the system for superimposing and outputting the two-dimensional code pattern image of the embodiment on the electronic document will be described with reference to FIG. 19.

This system includes an identification information management server 300, a document repository 310, and a printing device 320. The document repository 310 is a server in which are stored electronic documents and supplies electronic documents in accordance with user requests. The identification information management server 300 is a server that manages identification information for the two-dimensional code pattern image that is embedded in a document to be printed out and has a function to generate the above-mentioned two-dimensional code pattern image and superimpose it on the electronic document. The printing device 320 is used to print the image of the electronic document on which the two-dimensional code pattern image has been superimposed.

(1) In this system, a user first accesses the document repository 310 from a user terminal 330 to select a document to be printed from among the documents managed by the document repository 310.

(2) The document repository 310 that receives this selection transmits the data of the selected electronic document to the identification information management server 300.

The identification information management server 300 that received the electronic document data acquires unused identification information from an identification information database that the identification information management server 300 manages or generates identification information using a hash value of the electronic document to generate identification information for every assigned unit (for example, medium page, medium, electronic document page, overall electronic document, and so forth). The assigned unit for the identification information may be set in advance for the system. Furthermore, the assigned unit may be specified by the user that prints the electronic document. The identification information management server 300 maps, then registers into the identification information database, the generated identification information and the attribute information for the electronic document. The attribute information for the electronic document to be registered includes, for example, the storage location (such as URL) of the electronic document, information on the user (such as user identification information) who requested the printout, and identification information for the printing device 320 that prints out the electronic document. It is preferable for the assigned unit for the identification information to be smaller than the electronic document, such as a page, and for the identification information (such as page number) for the assigned unit within the electronic document to also be registered as one attribute information item. Furthermore, not only the attribute information but the electronic document data may also be registered into the identification information database.

(3) Furthermore, the identification information management server 300 uses the function of the image processing apparatus that was described using FIG. 17 to generate positional information that is to be printed on each page and to generate a two-dimensional code pattern image for representing the positional information and the identification information, and transmits the two-dimensional code pattern image and the electronic document to the printing device 320.

The printing device 320 generates a printed document 325 by superimposing and printing the image of the electronic document and the two-dimensional code pattern image.

Figure 19:
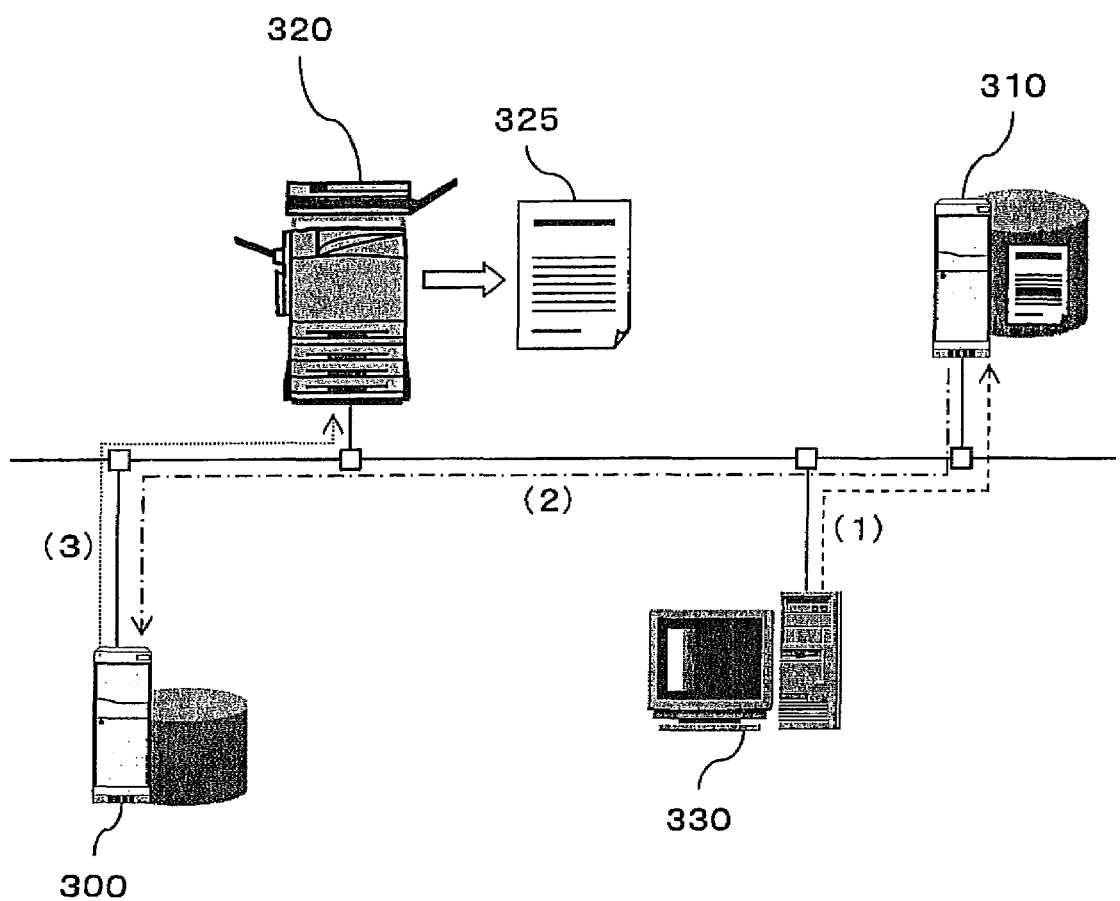
FIG. 19 shows a configuration of a system for superimposing and outputting the two-dimensional code pattern image of the embodiment on the electronic document.

According to the system in FIG. 19, the two-dimensional code pattern image, which includes identification information and positional information, is superimposed with respect to the user-selected electronic document from the existing document repository 310 and can be printed out.

When the user that acquired the printed document 325 writes onto the printed document with a pen with scanner that has the function of the code pattern image scanning apparatus of FIG. 12, the application software, which uses the information that was scanned with the pen with scanner, determines the locus of the writing from the positional information within the two-dimensional code pattern image that was scanned by the scanner during the writing operation. Furthermore, the application software sends the positional information and the identification information that was scanned simultaneously to the identification information management server 300 and acquires the electronic document corresponding to the identification information (or page information if the identification information is in page units) or the attribute information for the electronic document. If the electronic document was acquired, the data of the locus of the writing is added, for example, as an overlay plane image to the page that the identification information for the electronic document indicates. If the attribute information was obtained but not the electronic document itself, the data for the electronic document is acquired from the storage location that is included in the attribute information and to this data is added the writing data.

Furthermore, by using the attribute information for the electronic document that is managed by mapping to identification information, information relating to leakage of the printed document can be obtained. For example, if the identification information that is scanned from the printed document is used, information on the user who requested the printing of that document can be obtained as corresponding attribute information from the identification information management server 300. Thus, if this document was leaked, the path of the leak can be traced by asking the user who requested the printing regarding the circumstances. Furthermore, from the identification information for the printing device that includes the attribute information, the printing device that outputs the document can be identified so that this becomes information useful to specifying the path of the leak.

Furthermore, from the identification information that was scanned from the two-dimensional code pattern image of the printed document, the electronic document, which is the original of the printed document, can be acquired so that instead of copying the printed document, for example, the electronic document can be printed out to yield a clearer copy.

Furthermore, by using the attribute information for the electronic document that is managed by mapping to identification information, the manner of usage by a user with respect to the electronic document can also be managed. For example, although information on the user who requested printing is registered in the attribute information for the electronic document, other information, such as the operations allowed by the user (for example, authority for copying or writing), namely, the conditions for using the document by the user are registered. Thus, an application utilizing the information that was scanned by the code pattern image scanning apparatus can judge whether or not to allow the execution of an operation requested by a user from the identification information that was scanned from the printed document. A server can be prepared separately for managing user authority with regard to each document and the application program can acquire from the server the user authority that was determined from the identification information.

Hereinbefore, the identification information that was embedded in the two-dimensional code pattern image was described as being mapped by the identification information management server 300, such as to the user who requested the printing, the printing device that executed the printing, or condition for using the document by the user. However, the identification information is not limited to this and may be embedded with information on the user, printing device, or usage condition, and then embedded into the two-dimensional code pattern image.

Although the document repository 310, the identification information management server 300, and the printing device 320 were configured as discrete devices in the system shown in FIG. 19, this is only one example. Various other system configurations may be adopted, such as combining the document repository 310 and the identification information management server 300 into one server or combining the identification information management server 300 and the printing device 320 into one apparatus.

According to the embodiment described hereinbefore, a two-dimensional code pattern image can be provided so that both the positional information and the identification information can be scanned on a scanner having a smaller scanning area than in the related art.

The above-mentioned embodiment is for illustrative purposes only and various modifications can be devised within the scope of the technical idea of the present invention.

Figure 20:
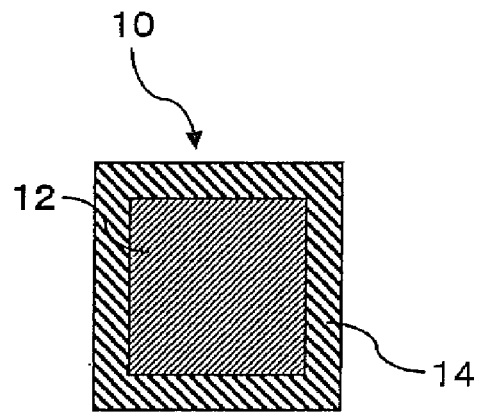
FIG. 20 shows a modification example of the position of the position code image in the unit region.
Figure 21:
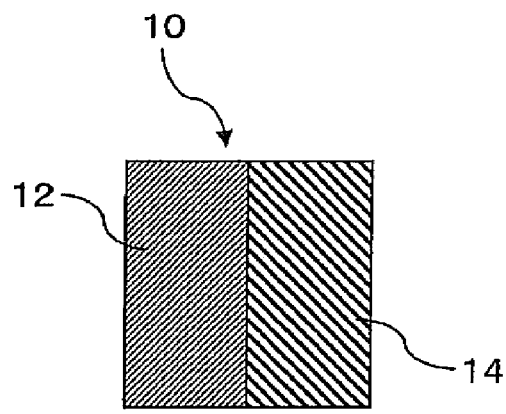
FIG. 21 shows another modification example of the position of the position code image in the unit region.

For example, in the example of FIG. 1, the position code image 12 is positioned on the side at the top left corner of the unit region 10. However, a similar effect is obtained even if, for example, the position code image 12 is positioned in the center of the unit region 10 as shown in FIG. 20. Furthermore, as shown in FIG. 21, in the case where the position code image 12 is only on the horizontal side of the unit region 10, the scanning range for the horizontal direction can be made smaller than in the related art.

Furthermore, although the unit region 10 had a square shape in the example above, it may have another shape, such as a rectangle.

Figure 22:
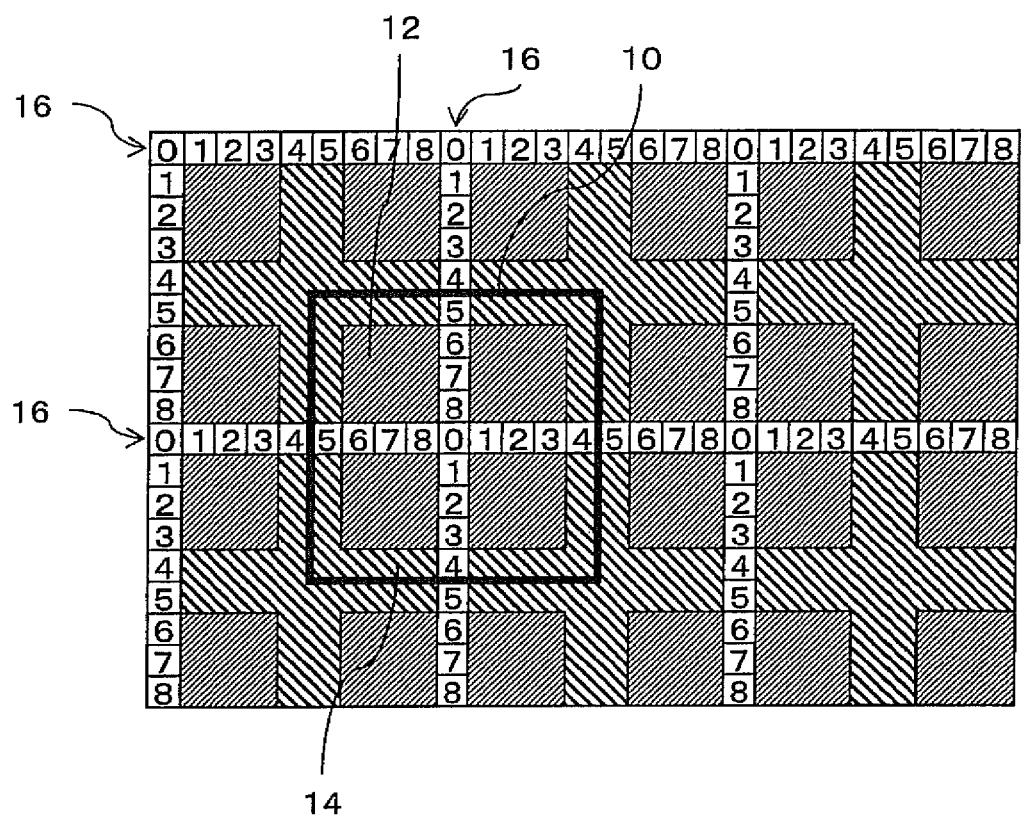
FIG. 22 shows a modification example of the positional relationship between the unit regions and the synchronizing codes.

The positional relationship between the synchronizing codes 16 and the unit region 10 or the image code image 12 is basically unrelated to the effect of the embodiment and need not be as shown in FIG. 4 or FIG. 6. For example, in the example of FIG. 22, the synchronizing codes 16 run vertically and horizontally through the center of the position code image 12. In this example, the position code image 12 corresponding to one positional information item is divided into four parts by the synchronizing codes 16 within the unit region 10. Even in this positional relationship, the position of the position code image 12 is similar to that shown in FIG. 4 and FIG. 6 so that a similar effect to the above-mentioned can be obtained.

Figure 23:
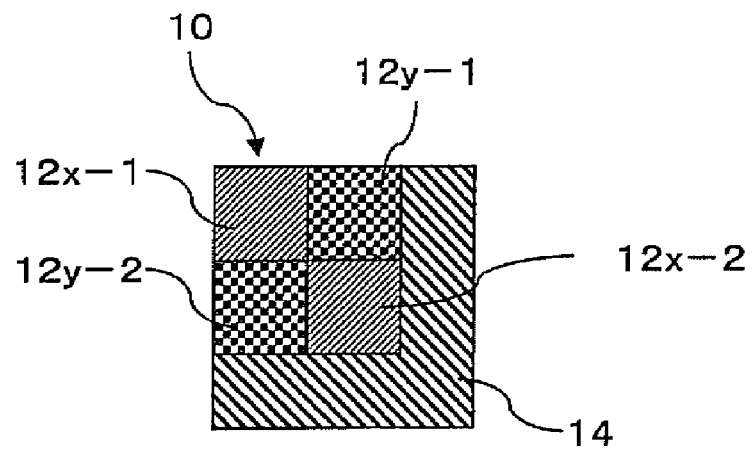
FIG. 23 shows a modification example in which the position code image is divided into sub-regions on the x coordinate and the y coordinate.
Figure 24:
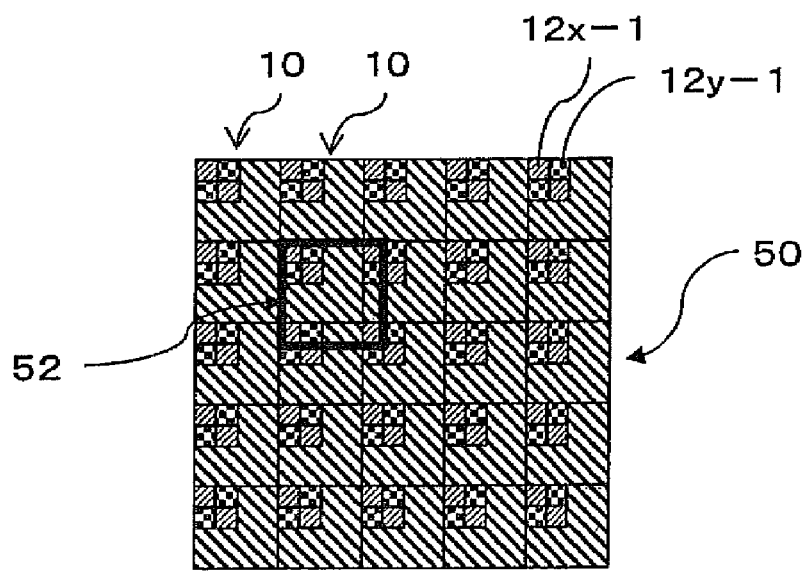
FIG. 24 illustrates the result of the modification example of FIG. 23.

Furthermore, regarding the structure of the position code image 12, a modified example shown in FIG. 23 can be considered. In this modified example, the position code image 12 is divided vertically and horizontally into two parts to yield four sub-regions $12x$-1, $12x$-2, $12y$-1, $12y$-2, where the x coordinate in the positional information is represented by two sub-regions $12x$-1, $12x$-2 in a diagonal direction and the y coordinate in the positional information is represented by two sub-regions $12y$-1, $12y$-2 in the other diagonal direction. In this manner, if the structure is adopted where the x and y coordinate portions are divided and the position code images are positioned on respective diagonal directions, the size of a scanning region 52 when scanning a two-dimensional code pattern image 50 can be set smaller than in the case where the unit region 10 of FIG. 1 was used (refer to FIG. 7A).

In this example, the x coordinate can be decoded if the two portions 12x-1, 12x-2 in the diagonal direction are scanned. Since the x coordinates in the same column of the two-dimensional code pattern image have the same value and the y coordinates in the same row have the same value, even if the position code image (total of four sub-regions) of one unit region 10 cannot be completely scanned, the x and y coordinates can be restored by combining and using parts of position code images scanned from horizontally adjacent unit regions 10 for the x coordinate and by combining and using parts of position code images scanned from vertically adjacent unit regions 10 for the y coordinate. Thus, even if the area of the scanning region 52 is set smaller than the example of FIG. 1, positional information can be scanned. In theory, the scanning region 52 should have a width that can cover the sub-regions 12x-1, 12y-2 in the left half of the right adjacent unit region in addition to the width of the target unit region 10 and should have a height that can cover the sub-regions 12x-1, 12y-1 in the upper half of the bottom adjacent unit region in addition to the height of the target unit region 10.

If the scanning range of the scanner is set smaller than that illustrated in FIG. 7A, it might not be possible to obtain the identification code image 14 only from the scanned image of the scanning region. However, in this case also, the missing part of the identification code image 14 can be compensated for from successively scanned images, such as during handwriting.

Furthermore, in the example of FIG. 1, a single unit of identification information was embedded into one unit region 10. However, not limited thereto, one identification information item may be divided and embedded into multiple unit regions 10. This becomes necessary assuming an application where the number of sheets or the number of pages to be identified exceeds the number of units of identification information that can be expressed by one unit region 10. This example will be described using FIG. 25 to FIG. 32.

Figure 25:
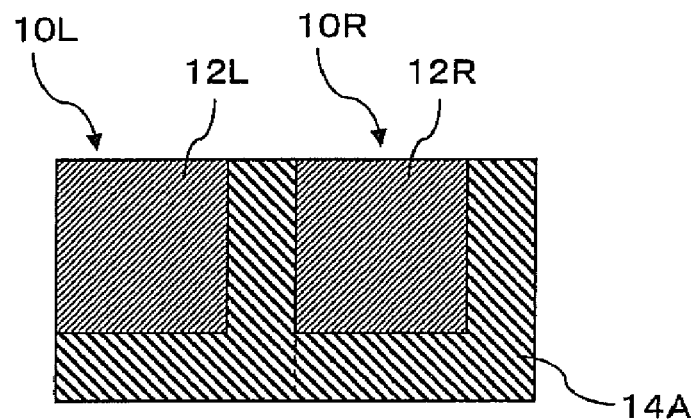
FIG. 25 shows an example of a code pattern representing one identification information item at two adjacent unit regions.

The example that is schematically shown in FIG. 25 is a code pattern that has one identification information item embedded in two horizontally adjacent unit regions 10L and 10R. A position code image 12L for the unit region 10L and a position code image 12R for the unit region 10R indicate mutually differing positions and identification code information 14A extending across both region 10L and region 10R represents one identification information item.

Figure 26:
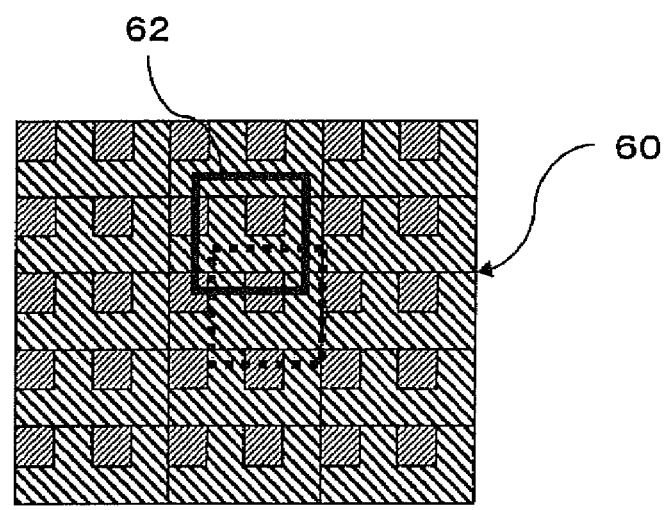
FIG. 26 schematically shows the two-dimensional code pattern image in which the unit regions of FIG. 25 are arranged in two dimensions.

FIG. 26 schematically shows a two-dimensional code pattern image 60 in which the code pattern of FIG. 25 is arranged in two dimensions. In this example, the size of the position code image 12 and the sizes of the unit regions 10L and 10R are the same as in the example of FIG. 1 so that it is desirable for a scanning region 62 for the scanner that is required to scan the positional information to be identical to the scanning region 32 shown in FIG. 7A. The scanning region 62 can completely cover in the field of view at least one of either position code image 12L or 12R while part of the identification code image 14A will not be scanned. However, the user can completely reconstruct the identification code image 14A, such as by handwriting, by successively moving the scanner on the two-dimensional code pattern image or by combining multiple scanned images that are obtained from scanning different multiple locations of the two-dimensional code pattern image. One example of this technique will be described with reference to FIG. 27 and FIG. 28.

Figure 27:
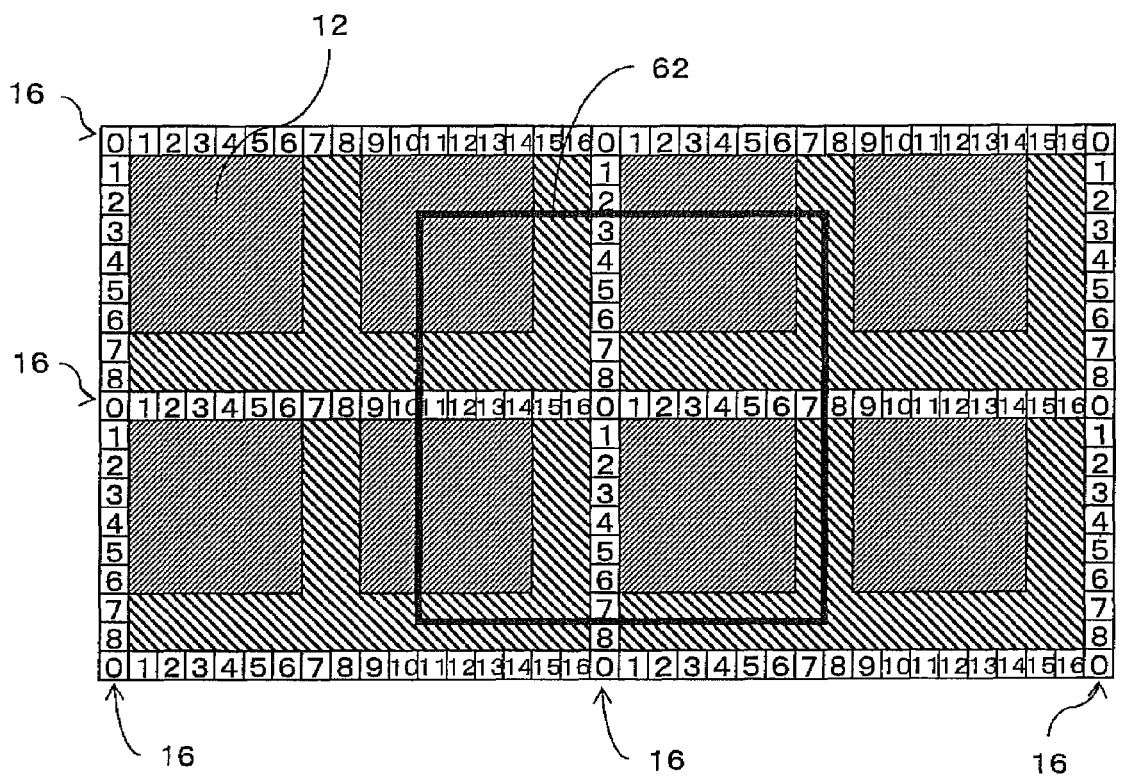
FIG. 27 shows an example of indexing for identification code matrixes or identification code images for decoding the identification information from the code pattern of FIG. 25.

Namely, in this example, the code pattern image scanning apparatus performs horizontal and vertical indexing shown in FIG. 27 using the information for the synchronizing codes 16 on the scanned image (or code symbol value matrix in which each pattern in the image is replaced by a symbol value) that was scanned by the scanner section 202. In this example, the unit regions 10L and 10R are adjacent without sandwiching the synchronizing codes 16 and the column of synchronizing codes 16 extending vertically is provided for every two unit regions 10L and 10R. In this example, the width of the identification code information 14A in the horizontal direction is twice that of the identification code image 14 of FIG. 1 so that the maximum number for the horizontal index is twice that of FIG. 16, or 16. The indexing rule may be identical to that for FIG. 16.

When indexed in this manner, one complete identification code image 14A (or corresponding identification code matrix) is composed of symbols, which have vertical indexes of 1-6 and horizontal indexes of 7-8 and 15-16, and symbols, which have vertical indexes of 7-8 and horizontal indexes of 1-16. Therefore, a complete identification code image or identification code matrix can be obtained by collecting and recomposing the frames corresponding to the above-mentioned sets of horizontal and vertical indexes from the scanned images of multiple frames.

Figure 28:
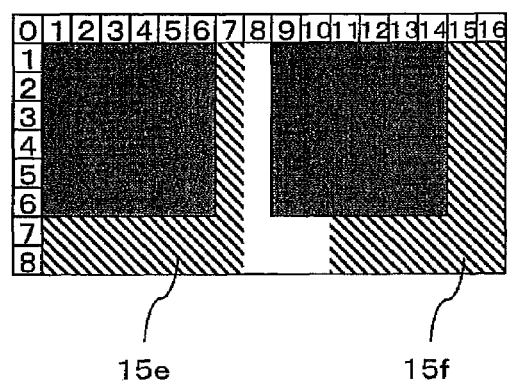
FIG. 28 shows a portion of the identification code image that is to be obtained from one scanned image in the case where the pattern of FIG. 25 is used.

For example, when the scanning region 62 shown in FIG. 27 is scanned, two portions 15e, 15f shown in FIG. 28 are obtained from the identification code image 14A (or identification code matrix) in the obtained scanned image. This is stored in a buffer for identification codes and the missing portion shown as white in FIG. 28 is compensated for from the scanned images of one or more frames.

Figure 29:
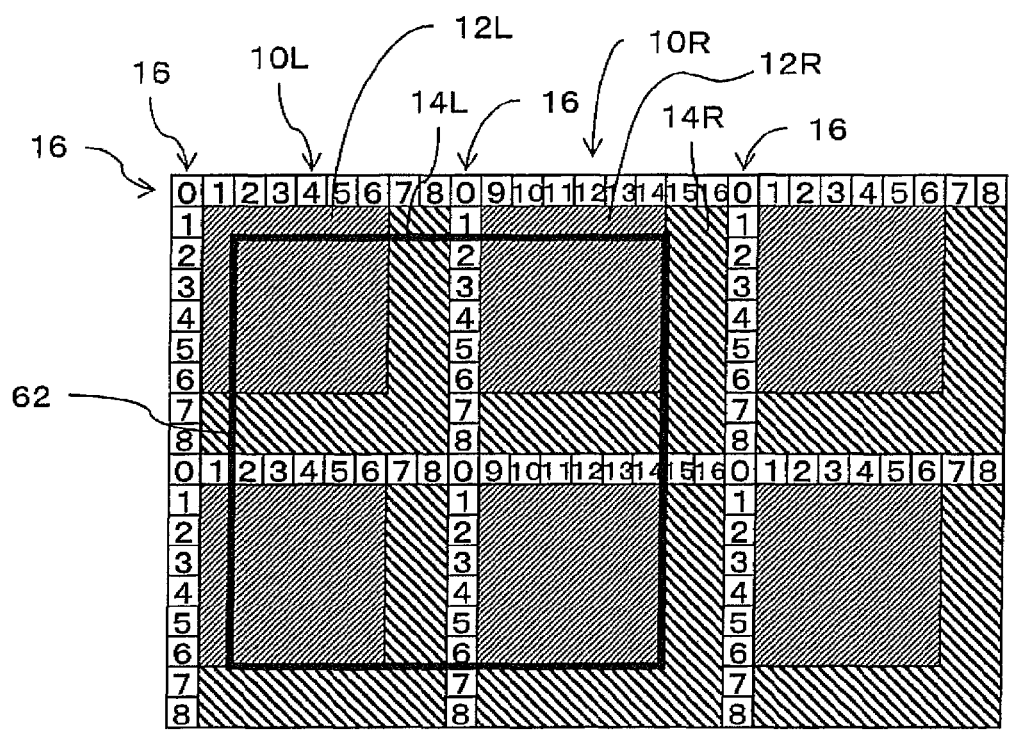
FIG. 29 shows another example of indexing for identification code matrixes or identification code images for decoding the identification information from the code pattern of FIG. 25.

When a column of synchronizing codes 16 are provided at every two horizontally adjacent unit regions as shown in the example of FIG. 27, the relationship between the length with the unit region as a unit and the actual dimension differs slightly between the vertical direction and the horizontal direction. In the example shown in FIG. 29, the synchronizing codes 16 are provided at the same pitch as in the example of FIG. 16. In FIG. 29, a left half part 14L of the identification code image 14A and a right half part 14R of the identification code image 14A are respectively and separately positioned in the unit region 10L and the unit region 10R. The indexing in this case is identical with the example of FIG. 16 for the vertical direction. For the horizontal direction, indexes of 1-8 are assigned to the left unit region 10L in the pair of unit regions and indexes of 9-16 are assigned to the right unit region 10R. Whether the unit region 10L or the unit region 10R is the left side or the right side of the pair can be determined from the x coordinate of the position code image 12L or 12R that is included in the corresponding unit region 10L or 10R. For example, a unit region is determined to be the left side if the x coordinate is odd and the right side if the x coordinate is even. Therefore, when the code pattern image scanning apparatus 200 finds a complete position code image from the image of the scanned region 62, the position code image is decoded to yield the x coordinate indicated by the position code image and indexing may be performed in the horizontal direction in accordance with this x coordinate. The reconstruction process of the identification code after indexing is the same as the one described with FIG. 27 and FIG. 28.

Similar to the above-mentioned example, if one identification information item is embedded in a set of N (where N is 3 or more) successive horizontal unit regions, the identification information can be decoded from the scanned images of multiple frames. In this case, from the remainder of dividing the x coordinate that was obtained from the position code image by N, the position number of the position code image in the N sets can be known so that indexing can be performed with the above-mentioned example.

Furthermore, also in the case of embedding one identification information item in the set of vertically successive multiple unit regions, the identification information can be decoded in the same manner.

Figure 30:
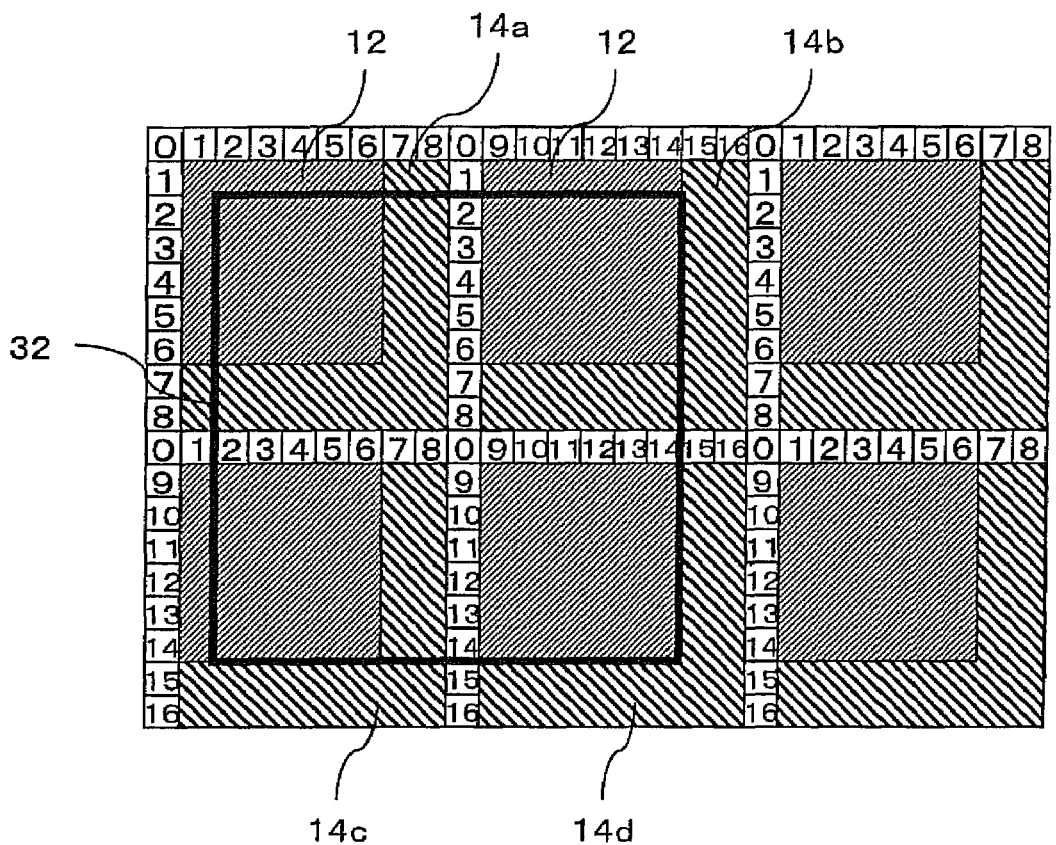
FIG. 30 shows an example of indexing in the case where one identification information item is dispersed and embedded in four unit regions of 2×2.
Figure 31:
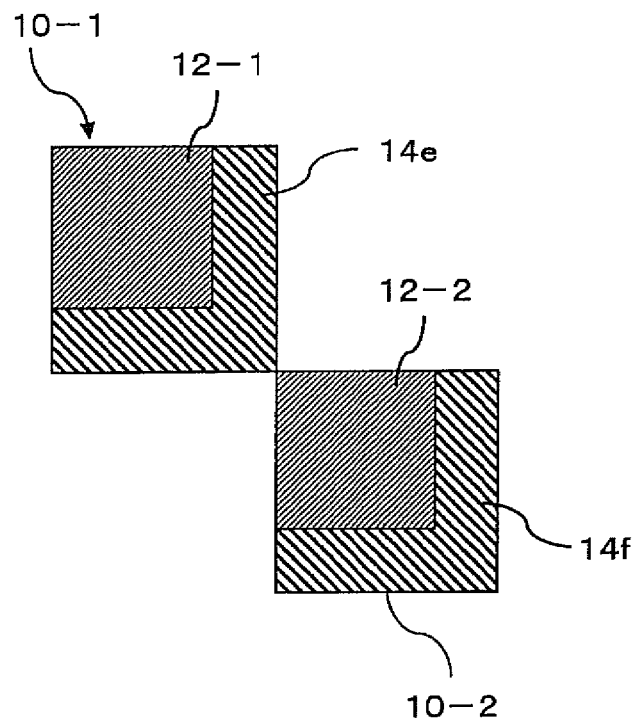
FIG. 31 shows an example of dispersing and embedding one identification information item in two diagonally adjacent unit regions.

Moreover, a similar handling is possible also in the case of dispersing and embedding one identification information item in a set of adjacent n×m (where n and m are integers of 2 or higher) unit regions of n rows high and m columns wide. FIG. 30 shows an example of indexing for a scanned image when one identification code image 14 is divided into four parts 14a, 14b, 14c, 14d and positioned in a set of 2×2 adjacent unit regions. In this case, to decode one identification information item, it is desirable to collect, from multiple scanned image, symbols having vertical indexes of 1-6 and horizontal indexes of 7-8 and 15-16, vertical indexes of 7-8 and horizontal indexes of 1-16, vertical indexes of 9-14 and horizontal indexes of 7-8 and 15-16, and vertical indexes of 15-16 and horizontal indexes of 1-16.

Figure 32:
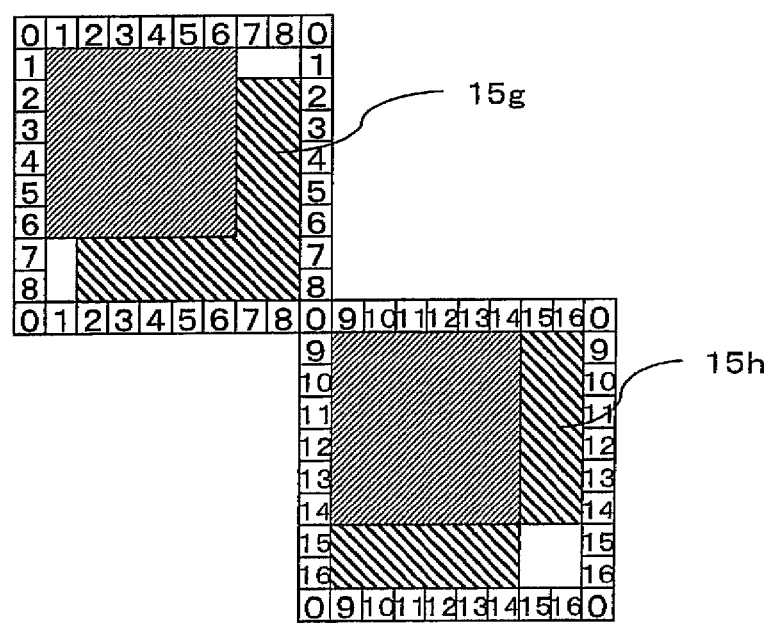
FIG. 32 illustrates a portion of the identification code image that is to be obtained from one scanned image in the case where the pattern of FIG. 31 is used.

Furthermore, the multiple unit regions 10 in which is dispersed one identification information item need not be necessarily adjacent. For example, in FIG. 31, one identification information item is dispersed and stored in identification code image regions 14e and 14f in diagonally adjacent unit regions 10-1 and 10-2. A complete identification code image or identification code matrix can be obtained by performing the same indexing as shown in FIG. 30 and by collecting, from multiple scanned images, symbols having vertical indexes of 1-6 and horizontal indexes 7-8, vertical indexes of 7-8 and horizontal indexes of 1-8, vertical indexes of 9-14 and horizontal indexes of 15-16, and vertical indexes of 15-16 and horizontal indexes of 9-16. For example, from the frame when the scanning region 32 shown in FIG. 30 was scanned, as shown in FIG. 32, two parts 15g and 15h of the identification code images can be acquired. The white portions in the regions of the identification code images could not be acquired in that frame and may be interpolated from another frame.

Thus, it was demonstrated that the identification information can be decoded from the scanned images of multiple frames even though one identification information item was dispersed in multiple unit regions. An example was described hereinbefore using an indexing technique to assemble identification code image fragments that are extracted from the frames into one complete identification code image. However, this is only one example. In any case, a known repetition rule indicates how the identification code information expressing one identification information item is to be repeated in a coordinate system or two-dimensional code pattern images so that if this repetition rule information is used, a portion that could be scanned in each frame can specify its position in the overall identification code image. Therefore, a complete identification code image can be restored by assembling the portions that could be scanned in each frame.

Furthermore, the above-mentioned example showed a diagonal pattern having different angles being used for the code symbols. However, it should be clear that the method of the embodiment is not dependent on the image pattern of the code symbols. Instead of diagonal patterns, a code symbol system indicating one bit of information at every grid point with an on or off dot for each grid point that was set in the code pattern area, or as in document 3, a code symbol system expressing 2 bits of information per grid point by shifting up, down, left or right the position where a dot is placed for each grid point that was set in the code pattern area may be used.

Furthermore, although the above-mentioned example as shown in FIG. 2 used the portion minus the edge margins on the surface of the sheet 20 for the code pattern area 22, the entire sheet surface may be used for the code pattern area 22.

Figure 33:
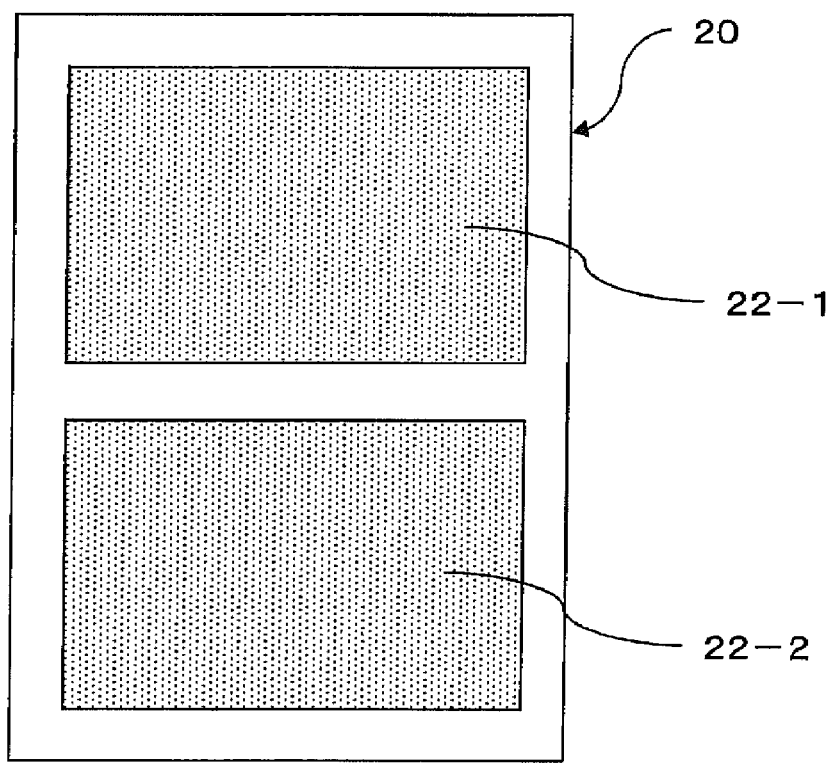
FIG. 33 shows an example where multiple code pattern areas are set on one sheet.

Furthermore, although the above-mentioned example as shown in FIG. 2 set one code pattern area 22 to one surface of the sheet 20, this is not essential. For example, as shown in FIG. 33, the surface of the sheet 20 is divided equally into two portions and each portion may be provided with code pattern area 22-1, 22-2, one per portion. In this case, coordinates within each code pattern area 22-1, 22-2 can be embedded as positional information. Furthermore, different identification information can be embedded for each of the code pattern areas 22-1, 22-2. For example, if N-up printing is used for reducing and printing N pages (where N is an integer of 2 or more) of an electronic document, to embed a two-dimensional code pattern image on each page of the electronic document, a method can be utilized for setting multiple code pattern areas 22 on one sheet surface.

Figure 34:
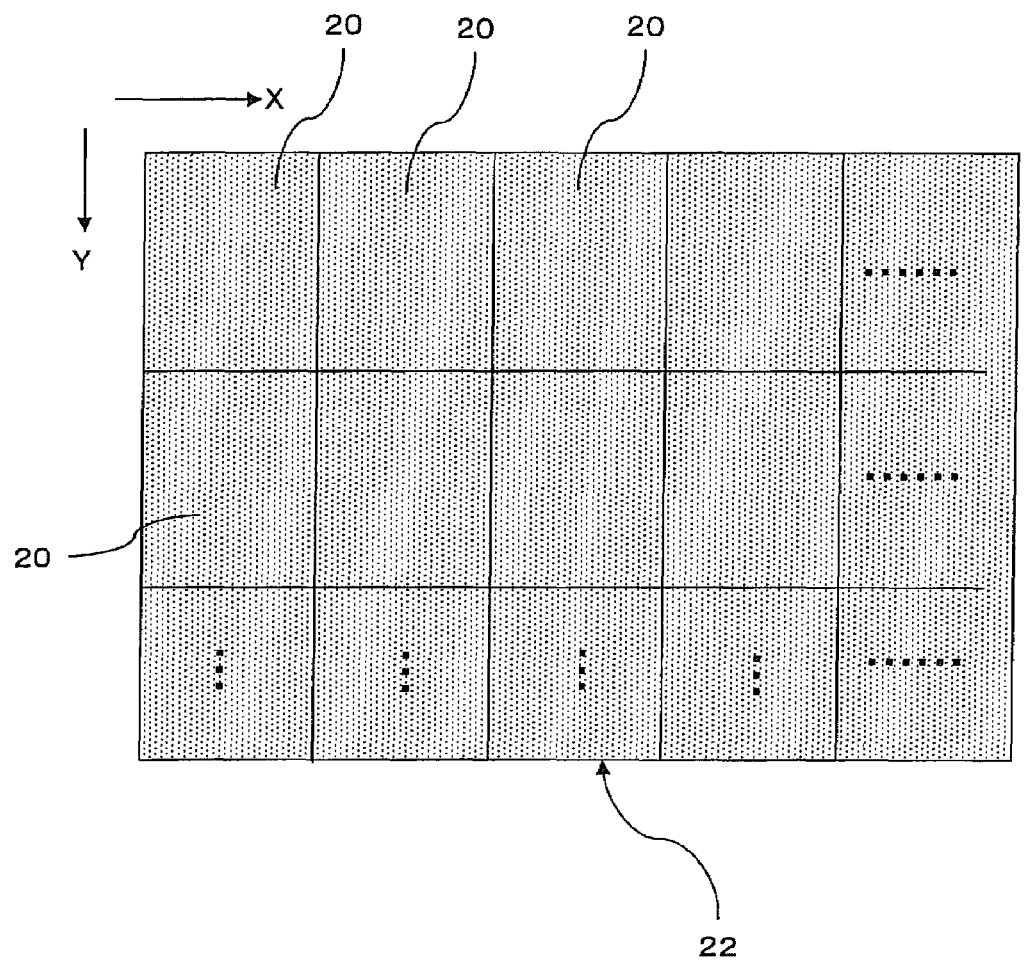
FIG. 34 shows an example where multiple sheets are assigned without superimposition in one large code pattern area.

Furthermore, vice versa, as shown in FIG. 34, the code pattern area 22 can be set to be larger than one surface of the sheet 20 and the surfaces of the sheets 20 can be assigned so as not to overlap in the coordinate system of the code pattern area 22. The identification information is common within the code pattern area 22 and the positional information differs at every position within the code pattern area 22. This method is applicable, for example, when identification information for a notebook or book is assigned to each page of the notebook or book.

Furthermore, although positional information indicating the coordinates of each coordinate position in the code pattern area 22 was embedded in the above-mentioned example, embedding information that differs according to every coordinate position instead of positional information also falls within the scope of the present invention. Furthermore, adding redundancy data to information that differs at every coordinate position combined with positional information may be embedded at each coordinate position. The information that differs at every coordinate position, including the aforementioned positional information, is referred to as position-dependent information.

Besides the aforementioned positional information, as position-dependent information, information relating to an object of the electronic document to be combined with a code pattern image can be illustrated. For example, a case can be considered where a dedicated icon image indicating an operation, such as "acquire electronic document", "print electronic document", "add handwriting to electronic document", "send mail", and so forth, is printed as a document image on part of a sheet and depending on the content of the icon image, a process for the electronic document is modified or a special process is performed. In this case, when the information indicating an operation corresponding to those icon images (objects) is embedded in a position corresponding to the icon image within the code pattern image, the information indicating the operation becomes position-dependent information that depends on the position on the sheet of the icon image on the sheet.

Furthermore, although the above-mentioned example embedded positional information together with identification information uniquely indicating a medium or a page of the medium or an electronic document or a page thereof in the two-dimensional code pattern image, a case, not limited to such identification information, where position-independent information that does not depend on the position within the code pattern area is embedded at each position in the area also falls within the scope of the present invention.

Besides the aforementioned example, as position-independent information, an example is information relating to the security of a printed material that has been printed with a code pattern image or a corresponding electronic document. For example, a condition for copying or scanning a printed material, such as "copying (or scanning) is prohibited", "access authentication is required for copying (or scanning)", or information on the right of access (for example, access denied) to an electronic document corresponding to the document that is printed on the printed material is embedded in the code pattern image as position-independent information.

Furthermore, although the printing of the two-dimensional code pattern image to a medium, such as a sheet, was described in the above-mentioned example, the present invention is also applicable to a case for electrically forming images on a display apparatus, such as electronic paper or a liquid crystal display device.

As described above, In one aspect of the present invention, a code pattern image generation apparatus generates a code pattern image, which includes position-dependent information differing at every position and position-independent information in common at various positions, wherein the code pattern image generation apparatus includes an image generator that generates a code pattern image by positioning multiple position-dependent code images, which include position-dependent information, along at least one side at a mutually predetermined spacing and repeatedly positioning a position-independent code image, which includes position-independent information, in the spacing between the positioned position-dependent code images.

Another aspect of the present invention provides a code pattern image scanning apparatus including a position-dependent information scanning section that detects the position-dependent code image from the scanned image, and decodes the position-dependent information from the position-dependent code image, a position-independent code image reconstruction section that reconstructs the position-independent code image by extracting a position-independent code image fragment from each unit pattern that is included in the scanned image and combining various fragments according to the positional relationship between unit patterns, and a position-independent information decoding section that decodes position-independent information from the reconstructed position-independent code image.

Yet another aspect of the present invention provides a code pattern image scanning apparatus including a position-dependent information scanning section that detects the position-dependent code image from the scanned image, and decodes the position-dependent information from the position-dependent code image, a position-independent code image reconstruction section that reconstructs the position-independent code image by extracting a position-independent code image fragment from each unit pattern that is included in the scanned images of a plurality of frames having different scanning positions and combining various fragments according to the positional relationship between unit patterns, and a position-independent information decoding section that decodes position-independent information from the reconstructed position-independent code image.

Yet another aspect of the present invention provides a code pattern image medium that is printed with a code pattern image in which are positioned a plurality of position-dependent code images, which includes position-dependent information differing at every position, at a mutually predetermined spacing along at least one side and in which is repeatedly positioned a position-independent code image, which includes position-independent information in common at various positions, in the spacing between the positioned position-dependent code images.

Although a preferred form of the present invention has been described in its preferred form with a certain degree of particularity using specific examples, it is to be understood that the invention is not limited thereto. It is further understood by those skilled in the art that various changes and modifications may be made in the invention without departing from the spirit and scope thereof.

What is claimed is:

1. A code pattern image scanning apparatus for reproducing position-dependent information and position-independent information from a scanned image, by a localized scan of a code pattern image, the code pattern image being formed by a plurality of unit patterns having identical size and shape, each unit pattern being formed by only first and second regions, the first region, which is a single region disposed in a unit pattern, being occupied by bit images forming the position-dependent code image such that all bit images forming the position-dependent code image are disposed in the first region, the first region excluding bit images forming the position-independent code image, the second region, which is an entire remaining region of the unit pattern, being occupied by bit images forming the position-independent code image, the code pattern image scanning apparatus comprising:

a scanner that scans a scanning region to generate a scanned image, the scanning region including a fragment of position-independent code image from each second region located in four unit patterns and one position-dependent code image located in a first region of one of the four unit patterns, two of the four unit patterns being adjacent in a vertical direction and two of the four unit patterns being adjacent in a horizontal direction;

a position-dependent information detecting section that detects the position-dependent code image from the scanned image and decodes the position-dependent information from the position-dependent code image;

a position-independent code image reconstruction section that reconstructs the position-independent code image by extracting the fragments of the position-independent code image from the scanned image, each extracted fragment of the position-independent code image corresponding to a second region located in the four unit patterns of the scanning region, and combining the extracted fragments according to the positional relationship between unit patterns; and a position-independent information decoding section that decodes position-independent information from the reconstructed position-independent code image.

2. The code pattern image scanning apparatus according to claim 1, wherein: the position-independent code image reconstruction section, in accordance with a position of each fragment with respect to the position-dependent code image that was scanned by the position-dependent information scanner, specifies a position to be occupied by each fragment in the position-independent code image and assembles the fragments.

3. A code pattern image scanning method for reproducing position-dependent information and position-independent information from a scanned image, the code pattern image being formed by a plurality of unit patterns having identical size and shape, each unit pattern being formed by only first and second regions, the first region, which is a single region disposed in a unit pattern, being occupied by bit images forming the position-dependent code image such that all bit images forming the position-dependent code image are disposed in the first region, the first region excluding bit images forming the position-independent code image, the second region, which is an entire remaining region of the unit pattern, being occupied by bit images forming the position-independent code image, the scanned image includes a fragment of position-independent code image from each second region located in four unit patterns and one position-dependent code image located in a first region of one of the four unit patterns, two of the four unit patterns being adjacent in a vertical direction and two of the four unit patterns being adjacent in a horizontal direction, the code pattern image scanning method comprising:

detecting the position-dependent code image from the scanned image and decoding the position-dependent information from the position-dependent code image;

reconstructing the position-independent code image by extracting the fragments of the position-independent code image from the scanned image, each extracted fragment of the position-independent code image corresponding to a second region located in the four unit patterns of the scanning region, and combining the extracted fragments according to the positional relationship between unit patterns; and decoding position-independent information from the reconstructed position-independent code image.

4. A code pattern image scanning apparatus for reproducing position-dependent information and position-independent information from a scanned image, the code pattern image being formed by a plurality of unit patterns having identical size and shape, each unit pattern being formed by only first and second regions, the first region, which is a single region disposed in a unit pattern, being occupied by bit images forming the position-dependent code image such that all bit images forming the position-dependent code image are disposed in the first region, the first region excluding bit images forming the position-independent code image, the second region, which is an entire remaining region of the unit pattern, being occupied by bit images forming the position-independent code image, the scanned image includes a fragment of position-independent code image from each second region located in four unit patterns and one position-dependent code image located in a first region of one of the four unit patterns, two of the four unit patterns being adjacent in a vertical direction and two of the four unit patterns being adjacent in a horizontal direction, the code pattern image scanning apparatus comprising:

a position-dependent information detecting section that detects the position-dependent code image from the scanned image and decodes the position-dependent information from the position-dependent code image;

a position-independent code image reconstruction section that reconstructs the position-independent code image by extracting the fragments of the position-independent code image from the scanned image, each extracted fragment of the position-independent code image corresponding to a second region located in the four unit patterns of the scanning region, and combining the extracted fragments according to the positional relationship between unit patterns; and a position-independent information decoding section that decodes position-independent information from the reconstructed position-independent code image.

5. The code pattern image scanning apparatus according to claim 4, wherein:

the position-dependent information indicated by the position-dependent code within the unit pattern is information indicating coordinates of the unit pattern in the code pattern image; the position-independent code image reconstruction section specifies, from coordinates indicated by the position-dependent code image that was detected by the position-dependent information scanning section from the scanned image of each frame, the position of the unit pattern within a set belonging to the respective unit pattern, and on the basis of the specified position, specifies the location occupied by each fragment within the position-independent code image and assembles the fragments.

6. A code pattern image scanning method for execution by a computer for reproducing position-dependent information and position-independent information from a scanned image, by a localized scan of a code pattern image, the code pattern image being formed by a plurality of unit patterns having identical size and shape, each unit pattern being formed by only first and second regions, the first region, which is a single region disposed in a unit pattern, being occupied by bit images forming the position-dependent code image such that all bit images forming the position-dependent code image are disposed in the first region, the first region excluding bit images forming the position-independent code image, the second region, which is an entire remaining region of the unit pattern, being occupied by bit images forming the position-independent code image, the scanned image includes a fragment of position-independent code image from each second region located in four unit patterns and one position-dependent code image located in a first region of one of the four unit patterns, two of the four unit patterns being adjacent in a vertical direction and two of the four unit patterns being adjacent in a horizontal direction, the code pattern image scanning method comprising:

detecting the position-dependent code image from the scanned image and decoding the position-dependent information from the position-dependent code image;

reconstructing the position-independent code image by extracting the fragments of the position-independent code image from the scanned image, each extracted fragment of the position-independent code image corresponding to a second region located in the four unit patterns of the scanning region, and combining the extracted fragments according to the positional relationship between unit patterns; and decoding position-independent information from the reconstructed position-independent code image.

* * * * *